(12) United States Patent
Choi et al.

(10) Patent No.: US 10,747,269 B1
(45) Date of Patent: Aug. 18, 2020

(54) FLEXIBLE DISPLAY DEVICE

(71) Applicant: LG ELECTRONICS INC., Seoul (KR)

(72) Inventors: Dong Jun Choi, Gyeonggi-do (KR);
Hang Seok Kim, Gyeonggi-do (KR);
Min Chul Shin, Gyeonggi-do (KR);
Gil Jae Lee, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/575,311

(22) Filed: Sep. 18, 2019

Related U.S. Application Data

(63) Continuation of application No. PCT/KR2019/007412, filed on Jun. 19, 2019.

(51) Int. Cl.
G06F 1/16 (2006.01)
G09F 9/30 (2006.01)

(52) U.S. Cl.
CPC .......... *G06F 1/1652* (2013.01); *G06F 1/1626* (2013.01); *G06F 1/1641* (2013.01); *G09F 9/301* (2013.01)

(58) Field of Classification Search
CPC .......................... H04M 1/0268; G06F 1/1652
USPC .................................................. 361/679.27
See application file for complete search history.

(56) References Cited

U.S. PATENT DOCUMENTS

| 7,440,265 | B2 * | 10/2008 | Ou Yang | ............... | G06F 1/1601 |
| | | | | | 348/375 |
| 7,577,467 | B2 * | 8/2009 | Schechtel | ................. | F03G 1/02 |
| | | | | | 455/550.1 |
| 9,081,540 | B1 * | 7/2015 | Cho | ...................... | G06F 1/1601 |
| 9,536,456 | B2 * | 1/2017 | Kang | ...................... | G09F 9/301 |
| 9,772,657 | B2 * | 9/2017 | Takayanagi | ........... | G06F 1/1615 |
| 9,860,353 | B2 * | 1/2018 | Lee | ..................... | H04M 1/0268 |
| 2009/0051830 | A1 | 2/2009 | Matsushita et al. | | |
| 2017/0255232 | A1 * | 9/2017 | Ram | .................... | G06F 1/1601 |

FOREIGN PATENT DOCUMENTS

| KR | 101107127 | 1/2012 |
| KR | 1020140059274 | 5/2014 |
| KR | 101695206 | 1/2017 |
| KR | 1020190004618 | 1/2019 |
| KR | 1020190062855 | 6/2019 |

OTHER PUBLICATIONS

PCT International Application No. PCT/KR2019/007412, International Search Report dated Mar. 17, 2020, 3 pages.

* cited by examiner

*Primary Examiner* — Anthony Q Edwards

(74) *Attorney, Agent, or Firm* — Lee, Hong, Degerman, Kang & Waimey PC

(57) ABSTRACT

A flexible display device is provided. A flexible display device according to an embodiment of the present invention is configured to include a body, a moving plate, a flexible display, and a driving module. The driving module is configured to include a bracket, a sliding plate including a rack, a driving motor, and a driving gear. The driving module is coupled to a body and a moving plate after assembling the driving module so that it is possible to prevent a sliding plate which slidably moves together with a flexible display after assembling the flexible display device from being loosen and also prevent the idle operation of the driving gear.

17 Claims, 18 Drawing Sheets

[FIG. 1]
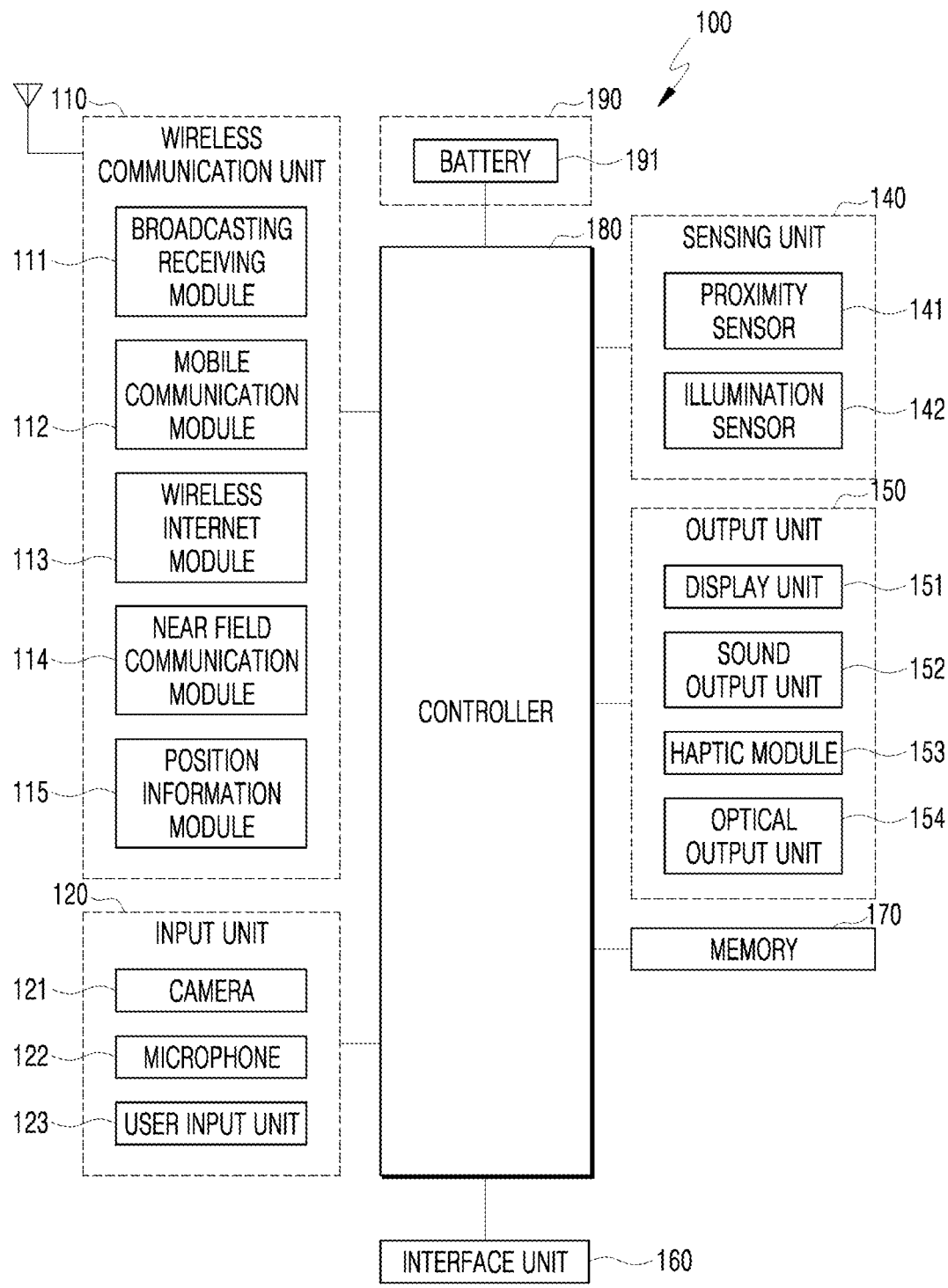

[FIG. 2A]
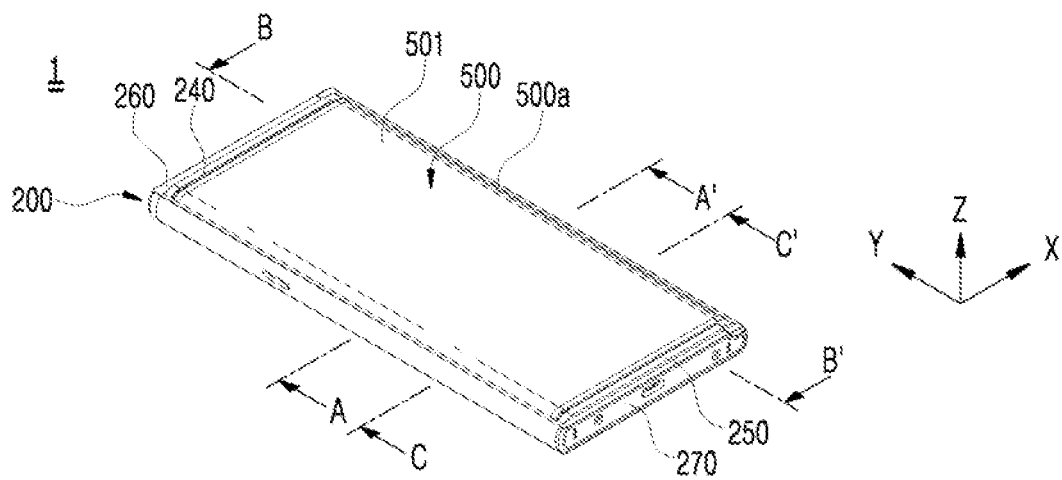
[FIG. 2B]
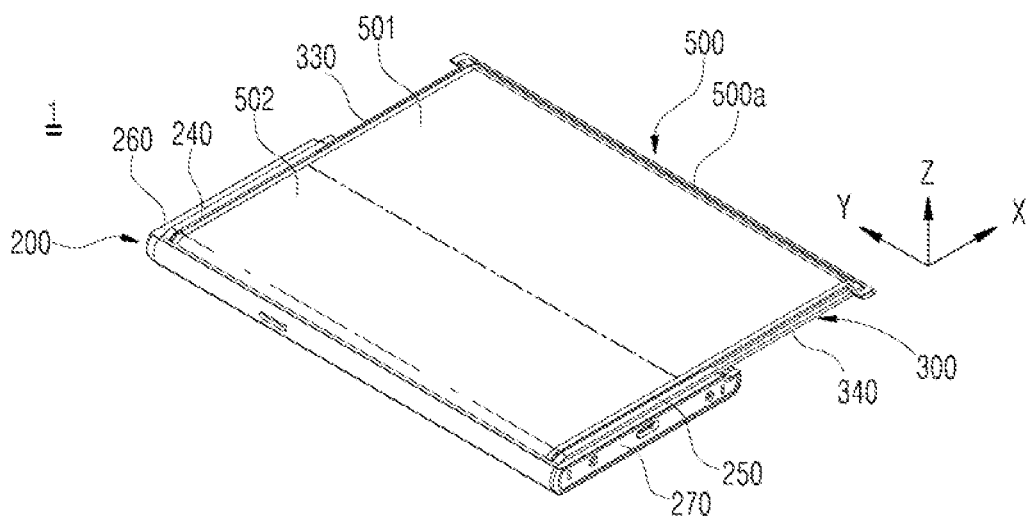

[FIG. 2C]
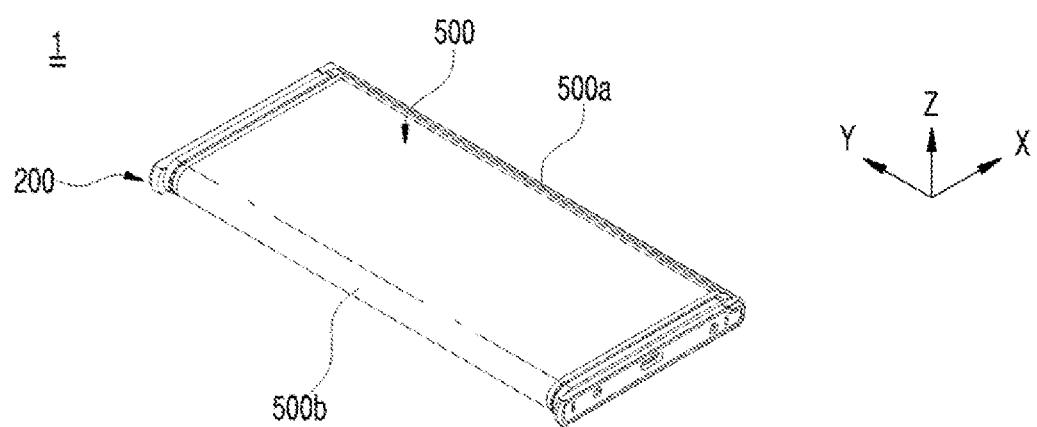

[FIG. 3]
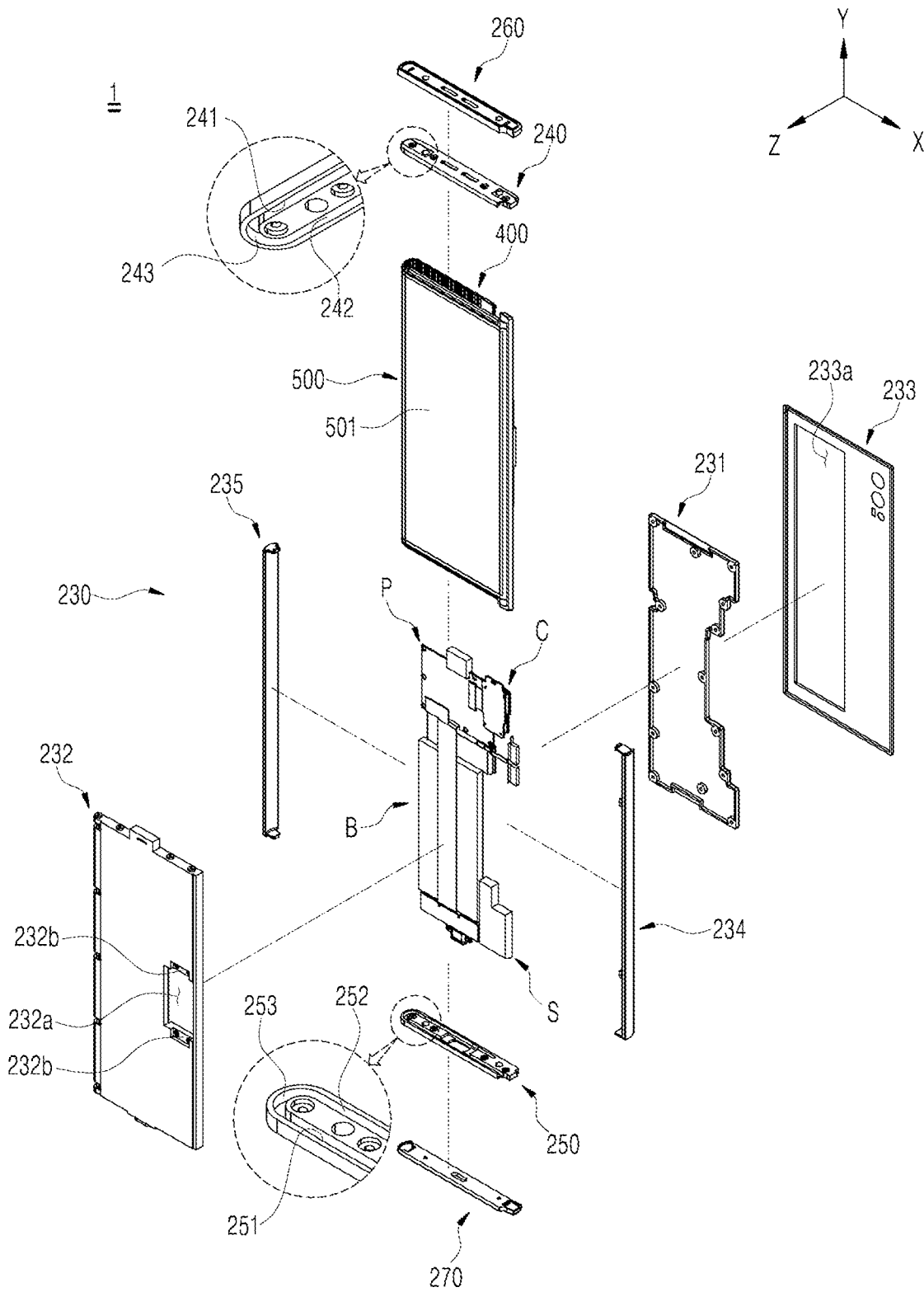

[FIG. 4]
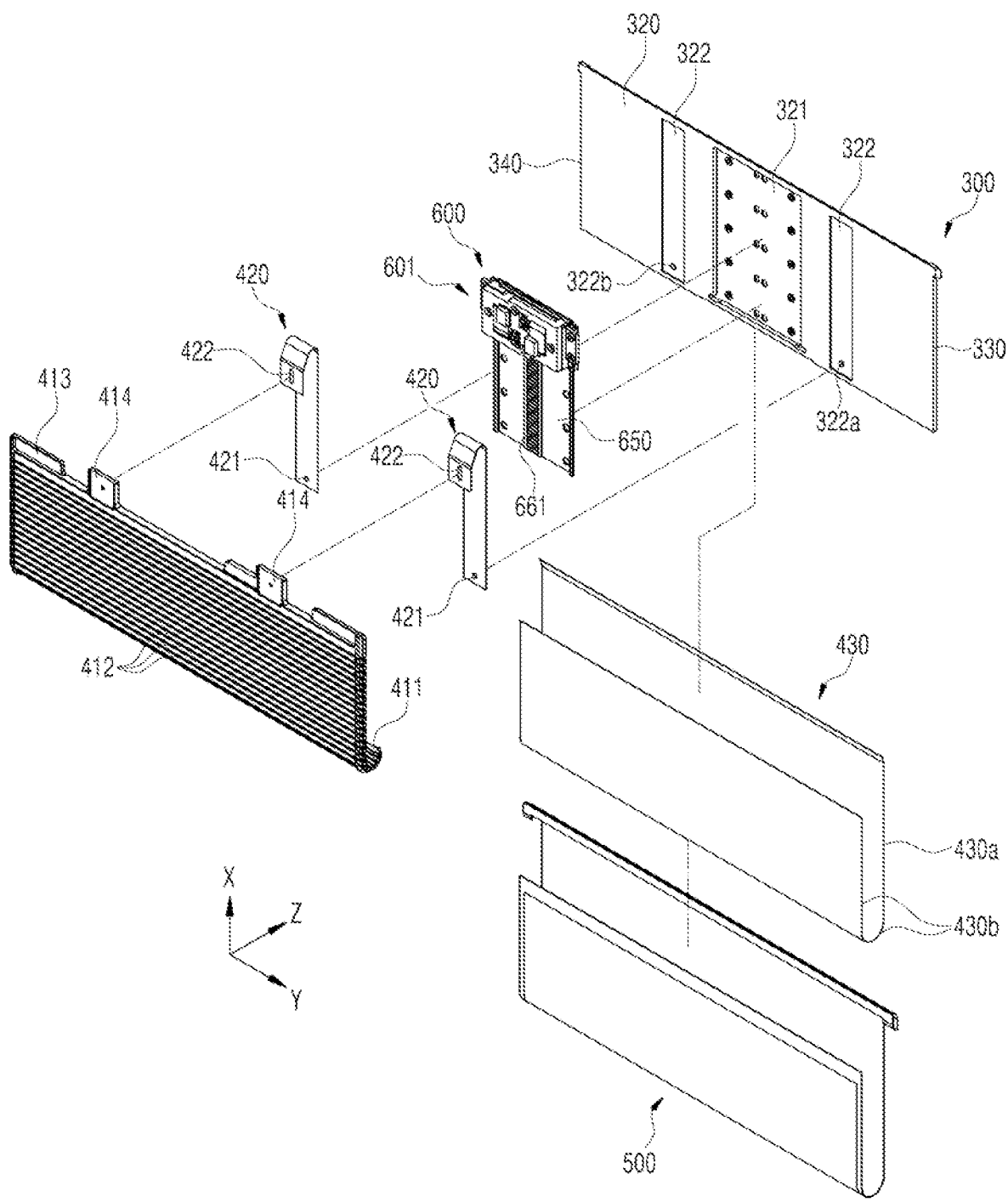

[FIG. 5]
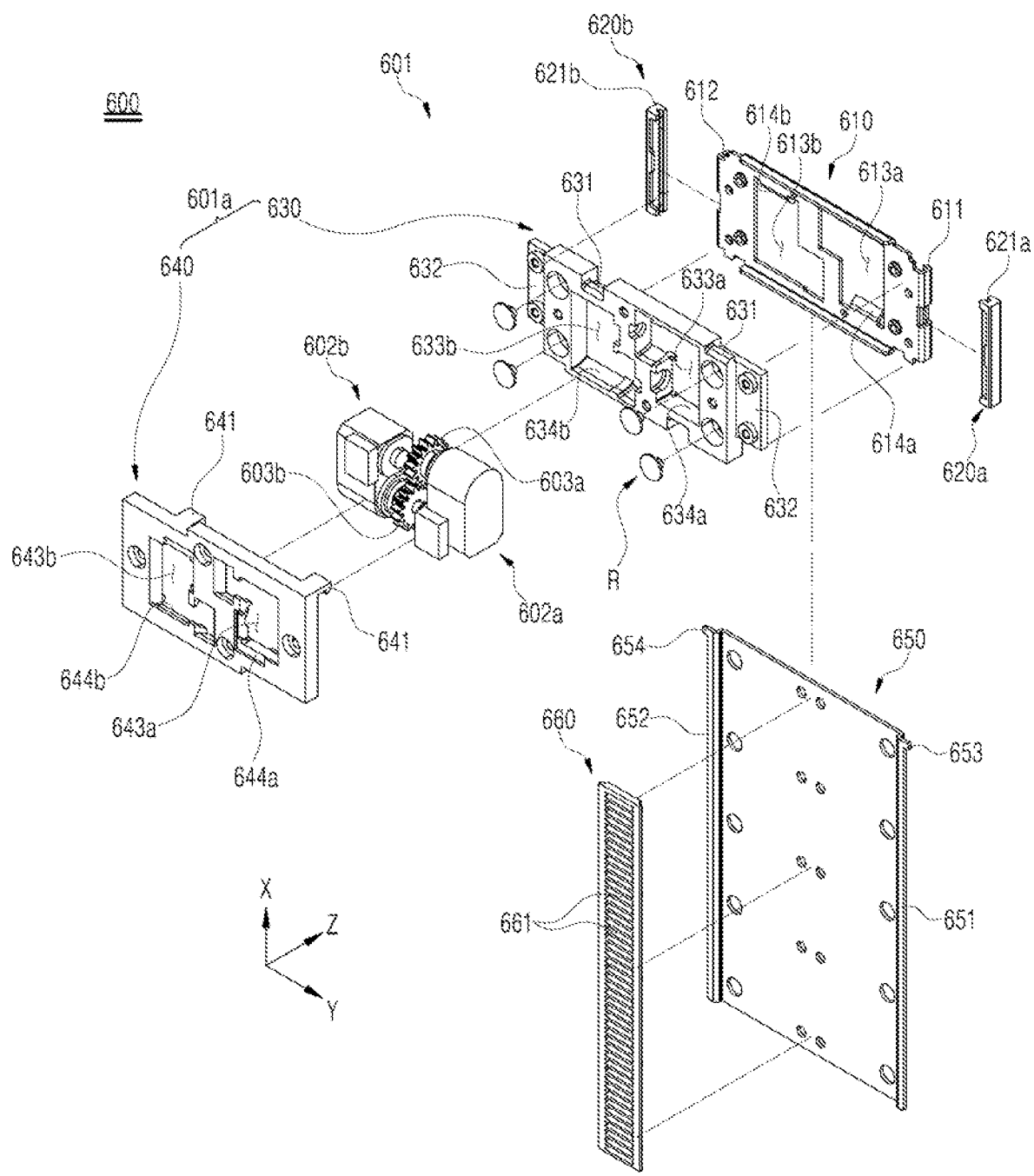

[FIG. 6]
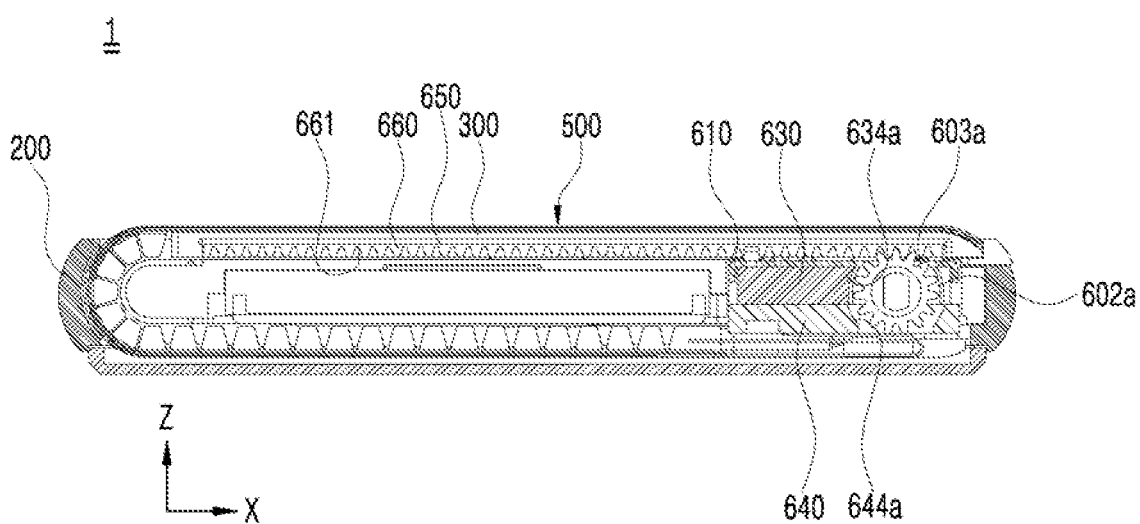

[FIG. 7]
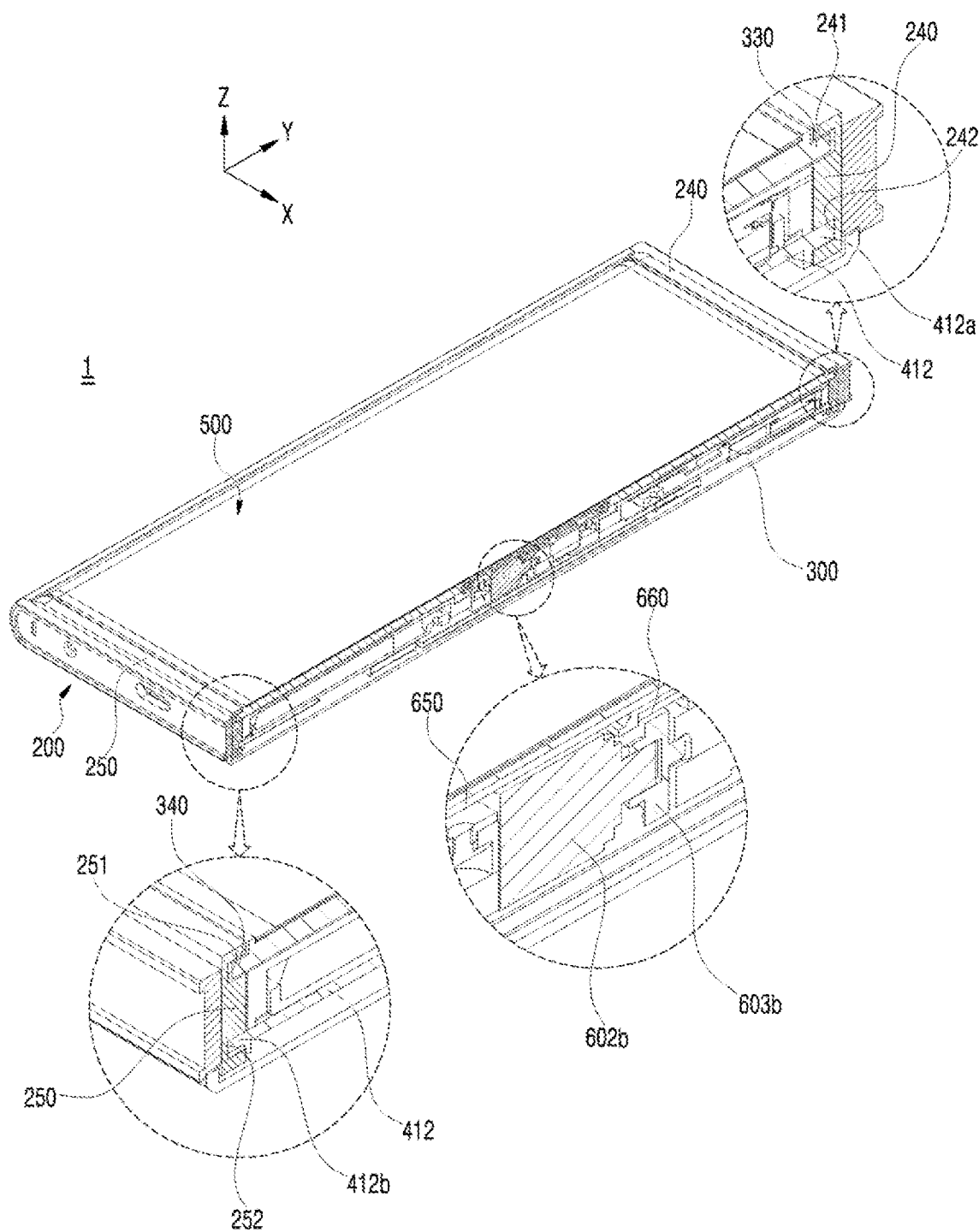

[FIG. 8]
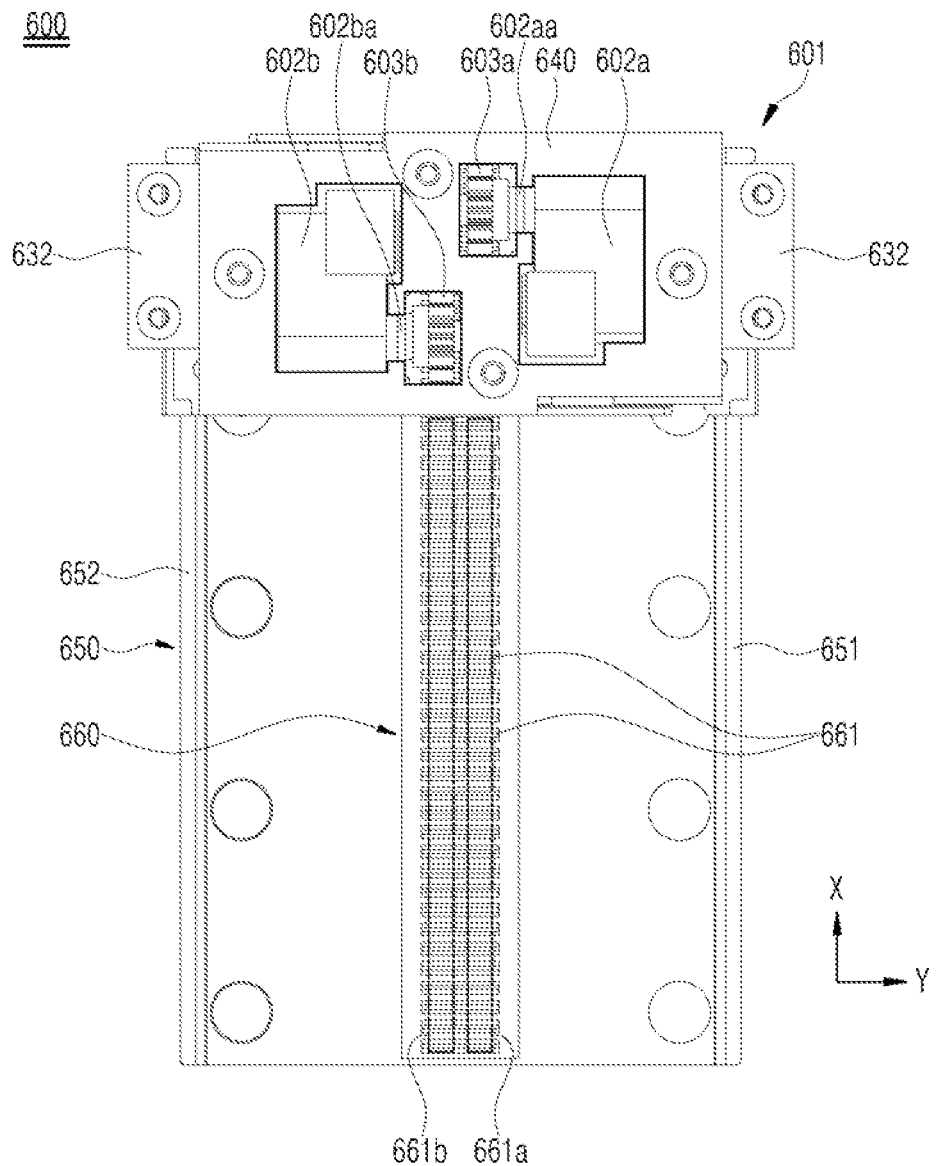

[FIG. 9A]
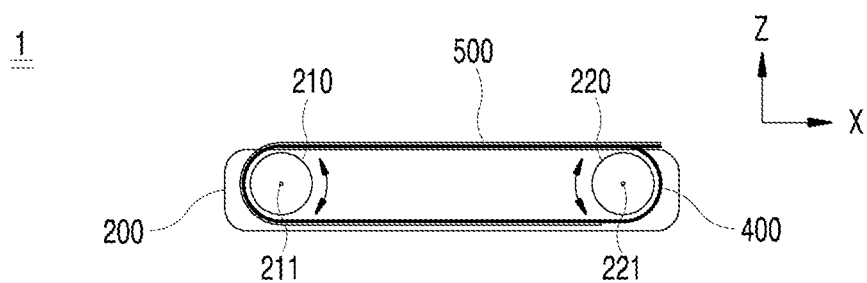
[FIG. 9B]
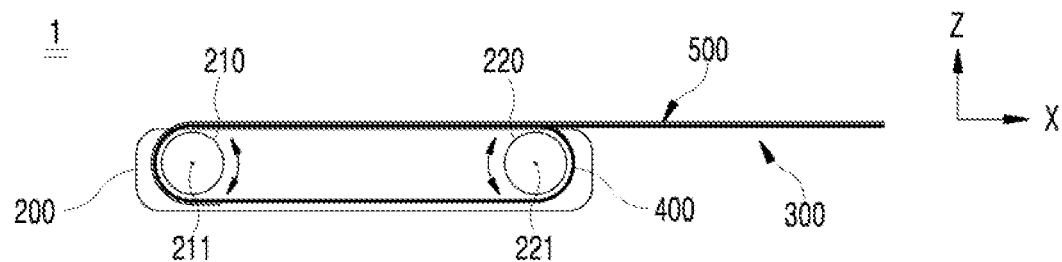
[FIG. 9C]
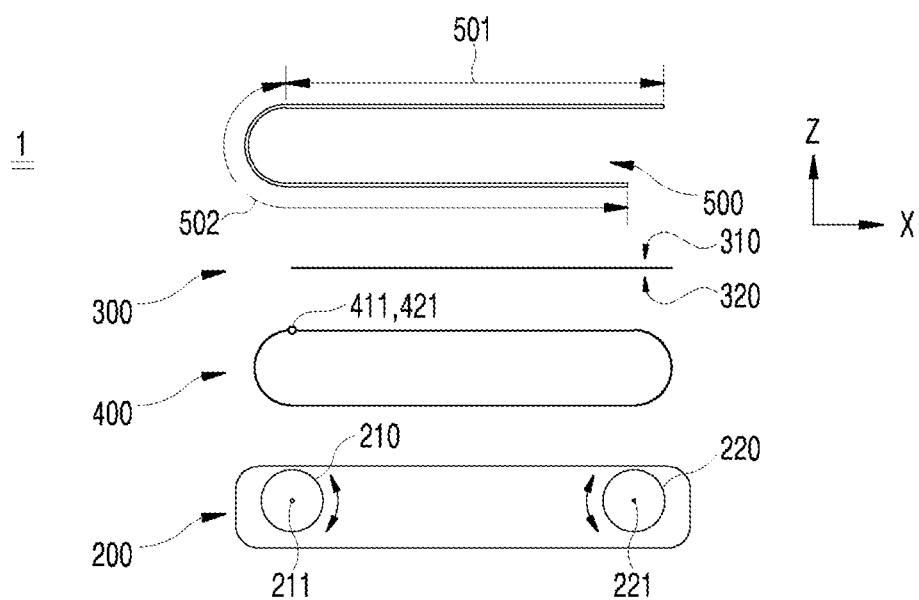

[FIG. 9D]
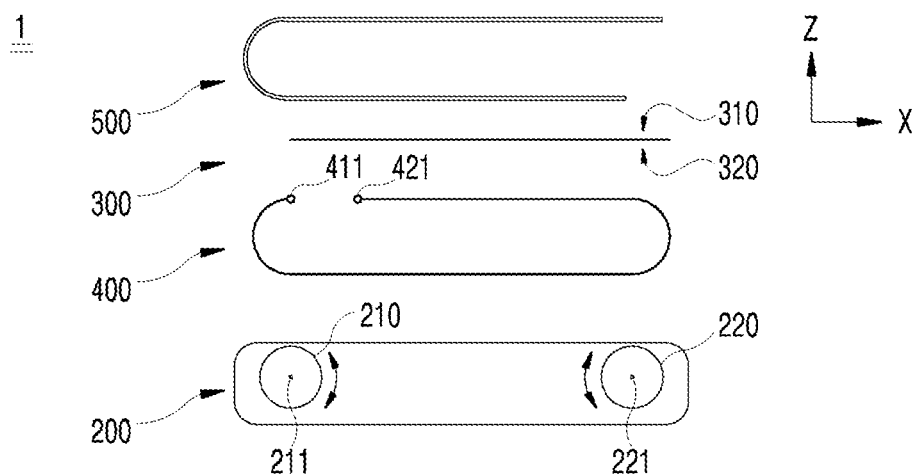
[FIG. 10]
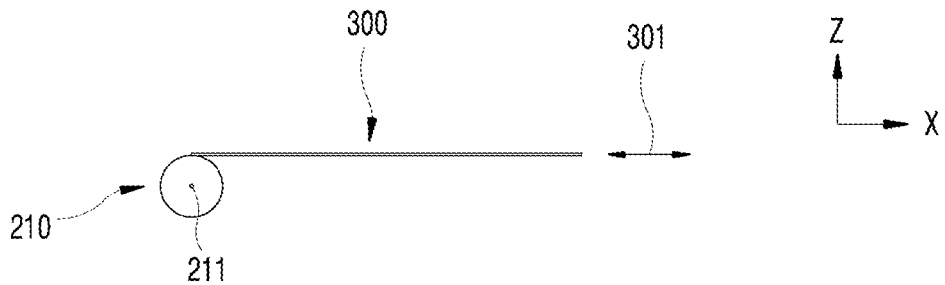
[FIG. 11A]
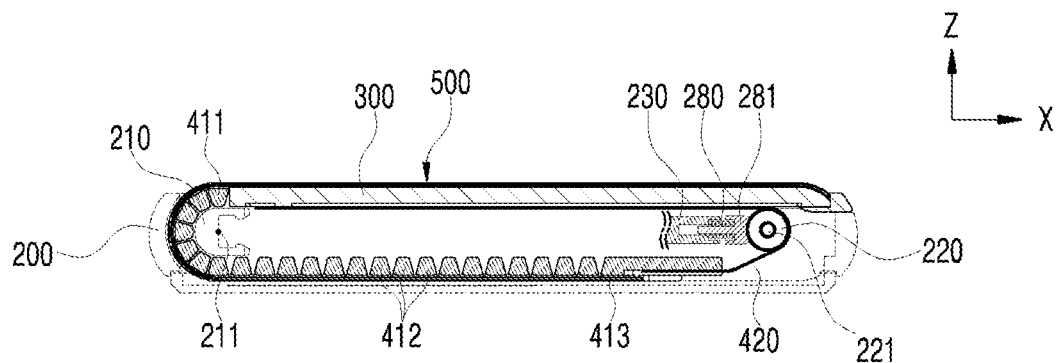

[FIG. 11B]
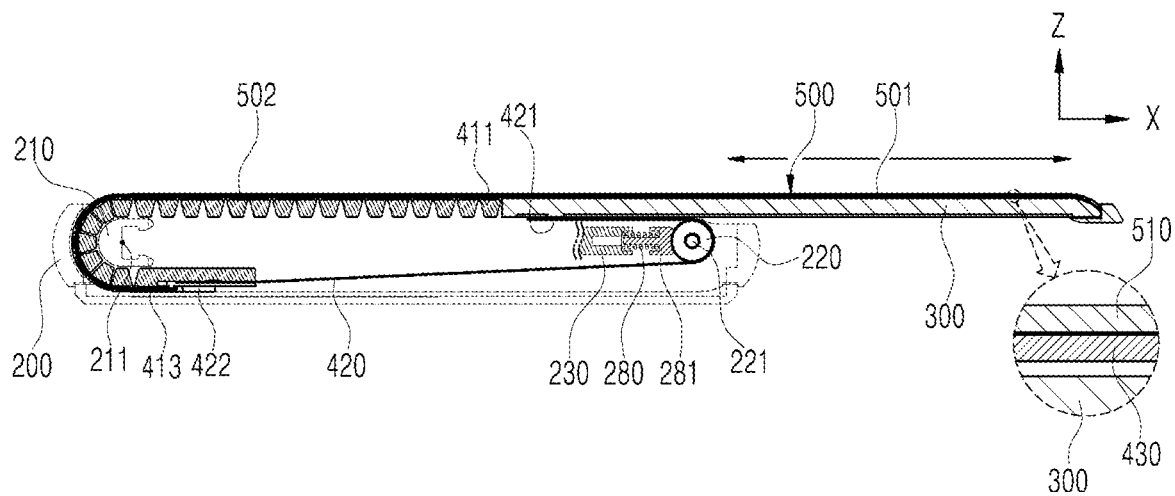
[FIG. 11C]
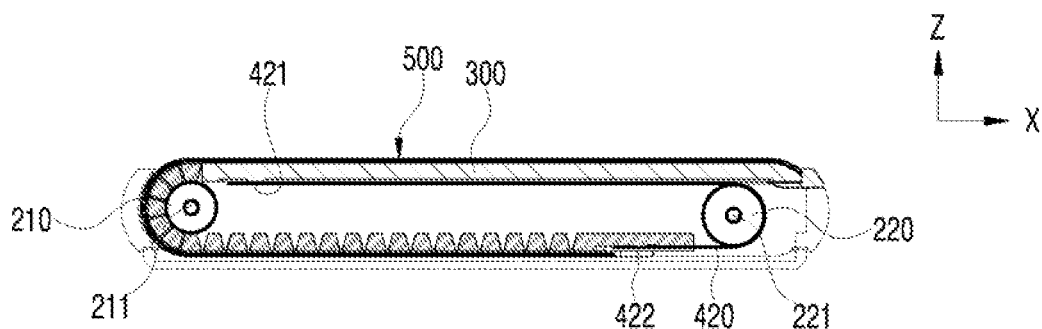
[FIG. 11D]
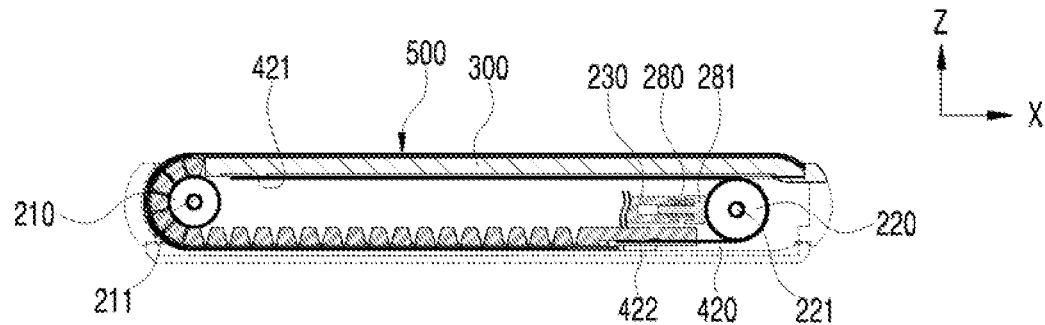

[FIG. 12A]
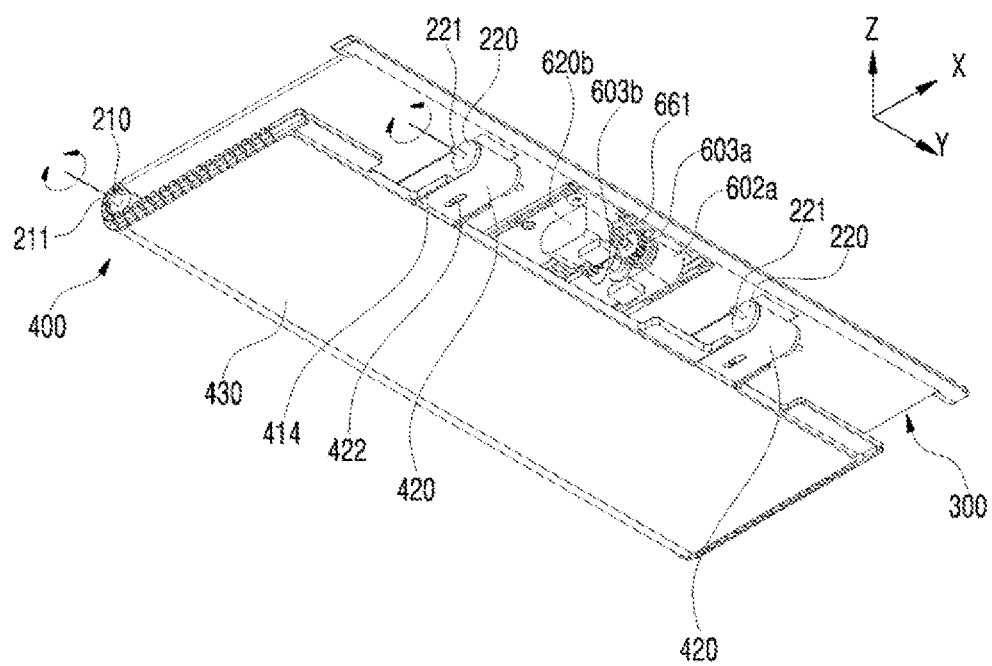
[FIG. 12B]
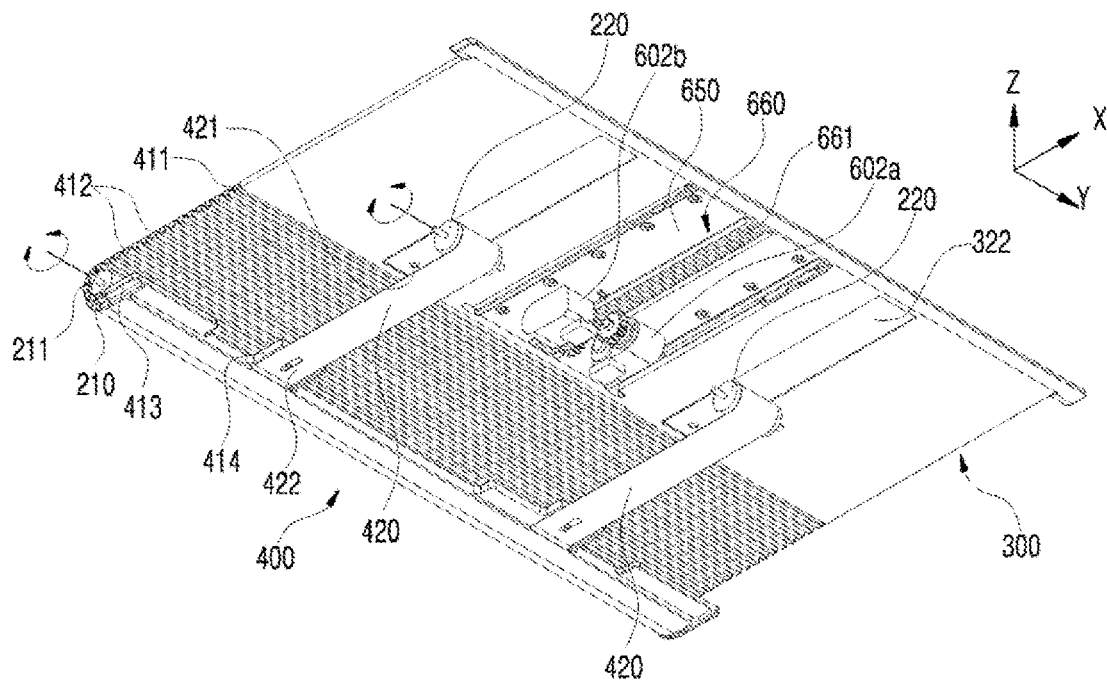

[FIG. 13]
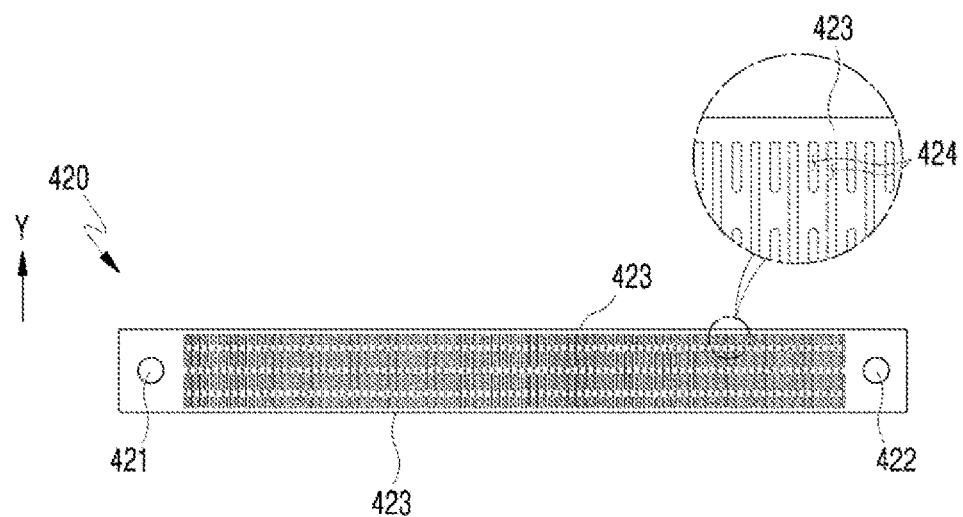

[FIG. 14]
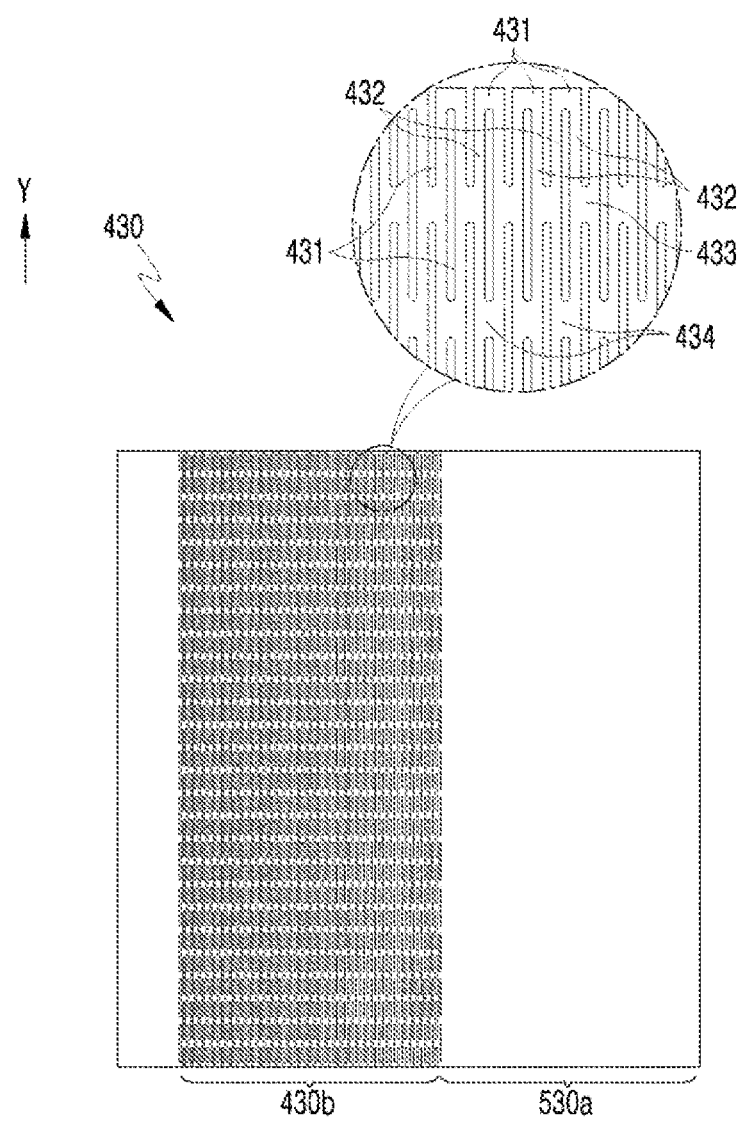

[FIG. 15A]
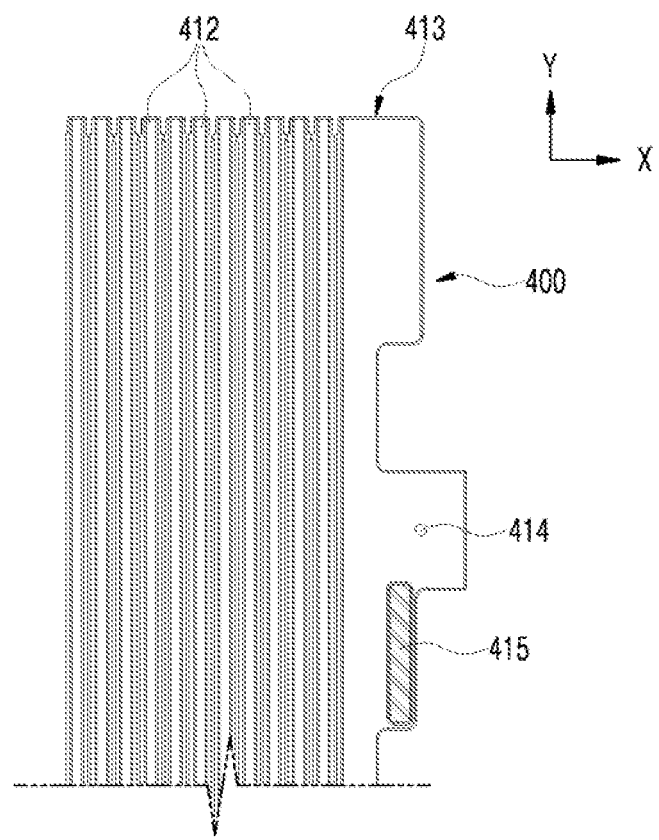

[FIG. 15B]
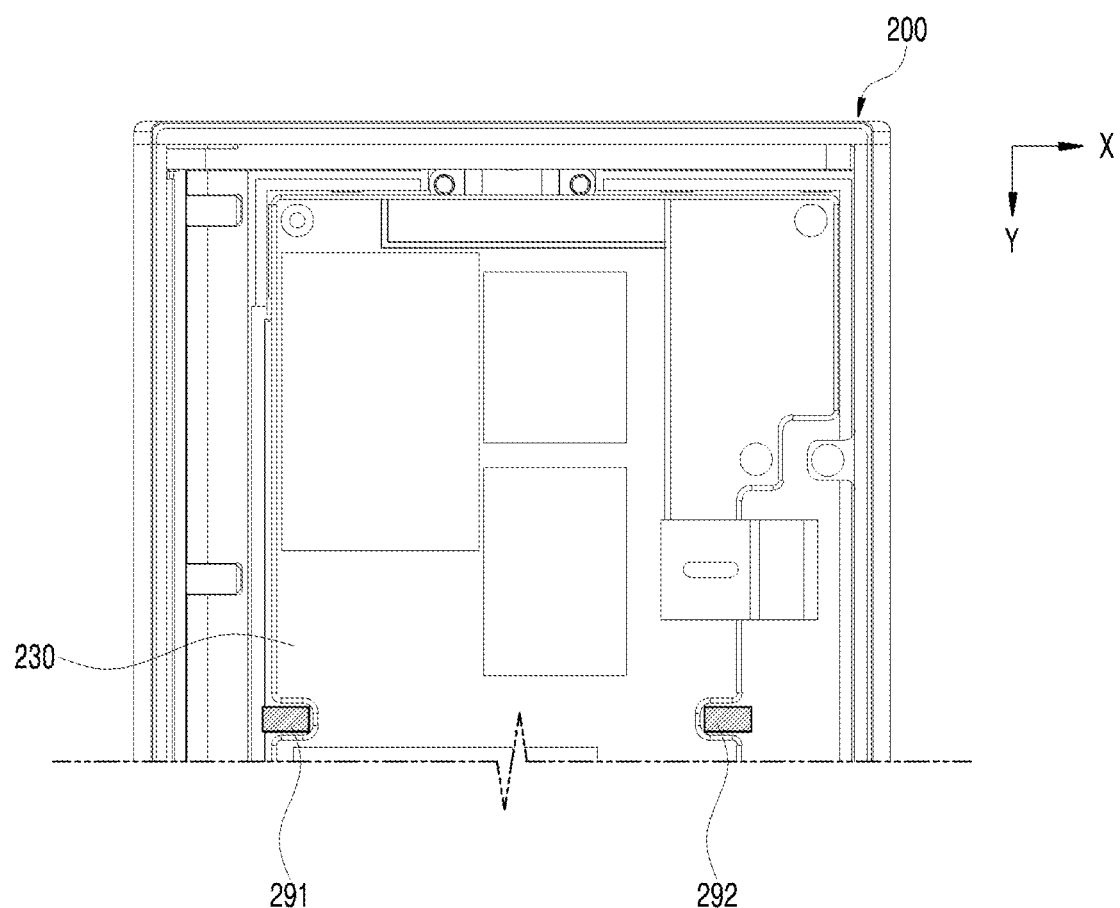

[FIG. 16A]
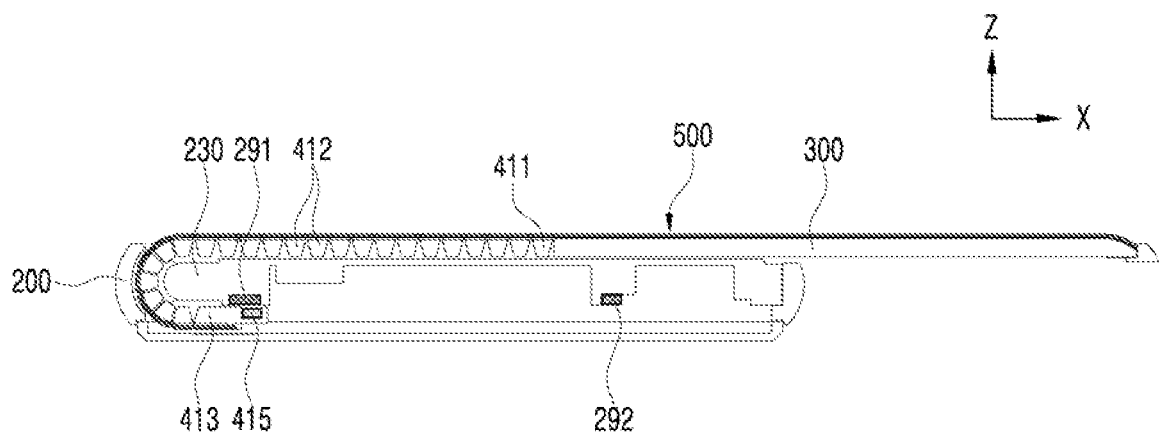
[FIG. 16B]
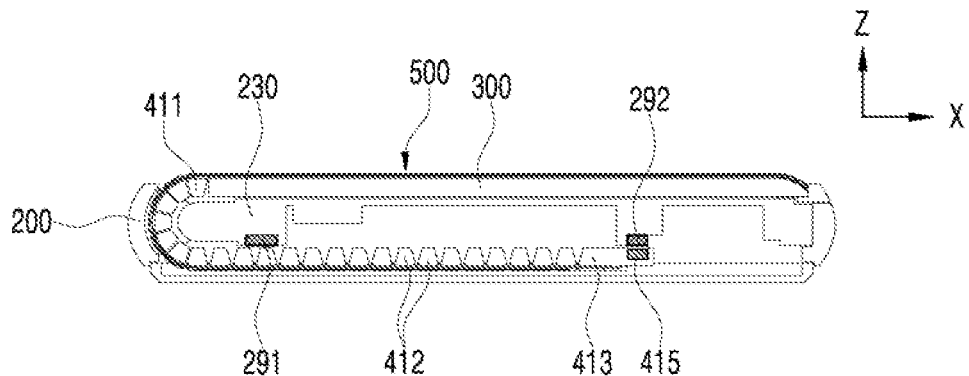

FLEXIBLE DISPLAY DEVICE

CROSS-REFERENCE TO RELATED APPLICATION

Pursuant to 35 U.S.C. § 119, this application claims the benefit of an earlier filing date and right of priority to International Application No. PCT/KR2019/007412, filed on Jun. 19, 2019, the contents of which are hereby incorporated by reference herein in its entirety.

TECHNICAL FIELD

The present invention relates to a display device with a bendable flexible display and more particularly, to a flexible display device in which an area of a flexible display which is exposed at any one side varies.

BACKGROUND ART

As a flexible display which is bendable while displaying image information is developed, studies and developments are being conducted for a foldable type device in which a flexible display is applied to a device having two bodies and folding structures (for example, hinge units). In such a device, since the flexible display may be entirely disposed on two bodies via the folding structure so that a large size display may be implemented in the device.

As another device using the flexible display, a rollable type device in which a display has a winding structure is being studied and developed. In such a device, the flexible display is wound so that a size or an area of the entire display may be reduced and the flexible display is unwound so that the size or the area of the entire display may be increased.

In the foldable type device and the rollable type device, the flexible display is elastically deformed or elastically restored while changing the shape. Therefore, in a part of the flexible display which is deformed, spring back may be generated.

When the spring back of the flexible display is generated, interference or friction between the flexible display and the other part of the device may occur or the flexible display may be damaged or the operation of the device may not be smoothly performed. Therefore, it is necessary to consider to control the spring back of the flexible display.

In the device using the flexible display, the movement (for example, sliding) of the flexible display may be generated. In this case, when the smooth movement is not performed or uniform tensile force is not applied to the flexible display while being moved, it is difficult to operate the device and the flexible display may be irregular or damaged.

As a related art document using a flexible display, Korean Patent No. 1107127 (hereinafter, referred to as a related art 1) discloses a mobile terminal. The related art 1 includes a flexible display in which a size of a screen exposed to the outside is variable, a driving unit, a sliding member, a first rack gear, and a second rack gear.

In the related art 1, a pinion gear is engaged with the first rack gear and the second gear and when the pinion gear rotates by a motor which configures the driving unit, the flexible display moves in a longitudinal direction. However, the related art 1 does not specifically disclose how the driving unit and the motor are connected to the terminal body and how the driving unit and the motor are assembled with other configurations.

Therefore, when the terminal is formed by the related art 1, problems in that the pinion gear is not precisely engaged with the first rack gear and the second rack gear to be highly likely to be idle, the first rack gear and the second rack gear are slanted, the flexible display is not appropriately moved, or the flexible display is wrinkled are predictable.

Further, in the related art 1, the size of the screen of the flexible display varies by the driving of the driving unit, but a separate configuration which supports a bottom surface of the flexible display is not provided so that unevenness of the flexible display may be easily caused.

Further, in the related art 1, the first rack gear and the second rack gear are separated to be coupled to the pinion gear. However, backlash of the gear may cause the deflection of the flexible display during the operation and it is difficult to control an overall tension of the flexible display.

Further, in the related art 1, it is difficult to apply uniform tension to the flexible display and it is also difficult to control the spring back in a portion where the flexible display is deformed.

It is very important to form a slim mobile terminal with various functions to improve the merchantability of the terminal. However, in the case of the related art 1, the possibility of interference between the driving unit and various components in the terminal and the assembling structure of the driving unit cannot be considered so that it is difficult to expect the improvement of the merchantability.

As another related art document using a flexible display, Korean Patent No. 1695206 (hereinafter, referred to as a related art 2) discloses a screen extendable portable terminal. In the related art 2, the flexible display is rolled around a cylindrical rotation member equipped in the housing.

The related art 2 does not disclose a configuration which supports a bottom surface of the flexible display when the screen of the flexible display rolled around the cylindrical rotation member is extended so that the flexible display may be easily irregular or deflected.

Further, in the related art 2, it is difficult to apply uniform tension to the flexible display when the screen of the flexible display rolled around the cylindrical rotation member is extended or reduced so that an excessive load may be applied to the flexible display.

Further, it is difficult to apply a winding type flexible display to a relatively small-size portable device and a radius of curvature is deformed in a wound portion so that it may be difficult to control the entire deformation of the flexible display.

Further, the related art 1 and the related art 2 do not disclose a specific control method and unit when the screen of the flexible display is extended or reduced.

SUMMARY OF THE INVENTION

Various embodiments of the present invention provide a flexible display device which prevents a plate which slidably moves together with the flexible display after being assembled from being loosen and also prevents an idle operation of a driving gear when a flexible display device in which an area of a flexible display exposed to any one side continuously varies is formed.

Various embodiments of the present invention still provide a flexible display device which may provide a driving unit for moving the flexible display as a module and minimize a thickness of the driving unit.

Various embodiments of the present invention still provide a flexible display device including a driving module which may maintain a balance between left and right while exhibiting a sufficient power to move the flexible display and ensure durability.

Various embodiments of the present invention still provide a new mechanism which when a flexible display device in which an area of a flexible display exposed to any one side continuously varies is formed, applies a uniform tension to the flexible display when an exposed area of the flexible display is increased or reduced.

Various embodiments of the present invention still provide a flexible display device with a structure in which a portion of the flexible display in which a shape is maintained and a portion in which the shape varies are stably supported and are located on the same plane or curved surface.

Various embodiments of the present invention still provide a flexible display device in which a spring back is easily controlled in a portion where the flexible display is elastically deformed.

Various embodiments of the present invention still provide a flexible display device in which when a support unit which supports the flexible display is formed, the support unit is easily deformed, and a uniform tension is applied to the support unit so that the support unit is prevented from being irregular.

Various embodiments of the present invention still provide a flexible display device in which an extendable range of a screen of the flexible display is specified and thus the motor is controlled.

The flexible display device according to the embodiment of the present invention is configured as follows:

The flexible display device may be configured to include a body, a moving plate, and a flexible display.

The flexible display device according to the embodiment of the present invention may be configured to include a driving module including a bracket, a sliding plate including a rack, a driving motor, and a driving gear.

In the embodiment of the present invention, a direction in which the moving plate moves with respect to the body is defined as a front-rear direction.

The moving plate may form a flat surface along the front-rear direction and forwardly and backwardly reciprocate with respect to the body.

The flexible display may be at least partially laminated on the outer surface of the moving plate to be coupled.

The driving module is configured to move the moving plate with respect to the body.

The bracket is coupled to the body.

The sliding plate is slidably coupled to the bracket along the front-rear direction and includes a rack in which a gear is repeated along the front-rear direction, and is coupled to the moving plate;

The driving motor is coupled to the bracket.

The driving gear is coupled to a rotary shaft of the driving motor and is engaged with the rack.

For the purpose of stable engagement of the driving gear and the rack and the stable sliding of the sliding plate, the driving module may be coupled to the body and the moving plate after being assembled.

The body is configured to include a first holder, a second holder, and a center body.

In the first holder, a first rail parallel to the front-rear direction is formed.

In the second holder, a second rail which is spaced apart from the first holder and is parallel to the first rail is formed.

The center body is configured to connect the first holder and the second holder.

A first slider which moves along the first rail is formed at a first side of the moving plate and a second slider which moves along the second rail is formed at a second side of the moving plate opposite the first side.

The rack is formed on a lower surface of the sliding plate, and the sliding plate is restrained by the bracket so that the movement in the up-down direction is blocked. Therefore, tight and stable engagement of the driving gear and the rack may be maintained.

In the embodiment of the present invention, a direction perpendicular to a surface of the moving plate is defined as an up-down direction. Further, a direction of the outer surface of the moving plate is defined as an upward direction.

The bracket may be configured to include a support bracket, a moving rail, and a cover bracket for assembly rigidity, assembly convenience, and the slim driving module.

The support bracket is formed of a metal plate and may include rail coupling units at left and right sides.

One pair of moving rails may be provided and symmetrically coupled to the rail coupling unit. Each of the moving rails is slidably engaged to an edge of the sliding plate and movably grasps both edges of the sliding plate. The moving rail may be formed of engineering plastic.

The cover bracket may be formed of plastic to be coupled to the support bracket and support the driving motor.

The cover bracket may include a middle cover bracket and a lower cover bracket to easily and stably couple the driving motor and form a slim driving module.

The middle cover bracket is configured to be coupled to a lower portion of the support bracket.

The lower cover bracket may be hooked with the middle cover bracket at the lower portion of the middle cover bracket.

The middle cover bracket comprises a first accommodating hole and a first locking unit. The first accommodating hole is configured to accommodate a part of the driving motor. The first locking unit is configured to prevent upward movement of the driving motor. The first locking unit forms a surrounding of the first accommodating hole and blocks the driving motor from being upwardly deviated.

The lower cover bracket comprises a second accommodating hole and a second locking unit. The second accommodating hole is configured to accommodate a part of the driving motor. The second locking unit is configured to prevent downward movement of the driving motor. The second locking unit forms a surrounding of the second accommodating hole and blocks the driving motor from being downwardly deviated.

A third accommodating hole in which a part of the driving motor is accommodated may be formed in the support bracket.

The driving gear may be engaged with the rack through the third accommodating hole.

A wing unit which is coupled to the body may be formed at left and right ends of the middle cover bracket or the lower cover bracket.

In the flexible display device according to the embodiment of the present invention, in the body, a bracket accommodating hole and a wing seating groove may be formed.

The bracket accommodating hole may be configured to pass through the body to accommodate the bracket.

The wing seating groove is formed to have a concave groove to seat the wing unit in the vicinity of the bracket accommodating hole.

In the flexible display device according to the embodiment of the present invention, the rack may be located at the center of the left-right direction of the moving plate.

one pair of driving motors and one pair of driving gears are provided.

One pair of driving motors is arranged along the left-right direction and each rotary shaft is parallel to the left-right direction.

One pair of driving gears is disposed between the pair of driving motors.

In the flexible display device according to an embodiment of the present invention, in order to improve the durability of the rack, when the pair of driving gears includes a first driving gear and a second driving gear, the rack may include a first rack unit and a second rack unit.

In the rack, a first rack unit may form an area engaged with the first driving gear and a second rack unit may form an area engaged with the second driving gear, but may not overlap the first rack unit.

In the flexible display device according to an embodiment of the present invention, the sliding plate excluding the rack may be formed of a metal plate. The rack may be formed of engineering plastic.

In the flexible display device according to an embodiment of the present invention, when the moving plate and the driving track move so as to increase or reduce an exposed area of the flexible display which is exposed at any one side, the driving track may form continuous tracks by itself or together with the moving plate so as to apply a uniform tension to the flexible display.

More specifically, a flexible display device according to an embodiment of the present invention may be configured to further include a first shaft, a first support, a second shaft, a second support, and a driving track.

The first shaft is parallel to the left-right direction, is located below the moving plate, and is located at the same point or behind a rear end of the moving plate.

The first support is located along the first shaft.

The first support may be rotatably coupled to the body with respect to the first shaft.

The second shaft is located below the moving plate, is located in front of the first shaft, and is parallel to the first shaft.

The second support is located along the second shaft.

The second support may be rotatably coupled to the body.

The moving plate may be coupled to the body so as to reciprocate along the movement path.

The driving track is formed to be at least partially bent to form a closed loop by closely surrounding the first support and the second support and is coupled to the moving plate.

The driving track reciprocates with respect to the first shaft and the second shaft.

The flexible display is wrapped around the first support and the second support to extend from a first side to a second side of the flexible display device. The first side may be an upper side of the flexible display device and the second side may be a lower side of the flexible display device. A part of the flexible display is coupled to an outer surface of the driving track and when the driving track reciprocates, the part thereof is located below the first support and the second support.

A part of the flexible display may be coupled to the outer surface of the moving plate and the other part may be coupled to the outer surface of the driving track.

The flexible display may include a basic exposed region (a first region) which is exposed to overlap the outer surface of the moving plate; and an additional exposed region (a second region) which is exposed to overlap the outer surface of the driving track other than the basic exposed region.

In the flexible display device according to an embodiment of the present invention, a size of the additional exposed region which is exposed at the same side as the basic exposed region varies in accordance with the movement of the moving plate.

The driving track may be configured to include a back plate, hinge segments, and a guide plate.

The back plate is formed of a metal plate having elasticity to be coupled to an inner surface of the flexible display.

A plurality of hinge segments is elongated along the left-right direction and continuously arranged on the inner surface of the back plate to be coupled.

The guide plate may be formed of a metal plate at least partially having elasticity and have one end connected to the hinge segment and the other end coupled to the moving plate.

Surfaces of the first support and the second support which are in contact with the driving track may form a curved surface.

The first support and the second support may relatively move to be spaced apart from each other.

The flexible display device according to an embodiment of the present invention may further include an elastic body which elastically supports any one of the first support and the second support to be spaced apart from the other one.

The driving track may include a magnet and the body may be configured to include a first hole sensor and a second hole sensor.

A first hole sensor may sense the approach of the magnet when the moving plate forwardly moves. The first hole sensor may be configured to sense a position of the magnet of the driving track as the moving plate is moved from the first position toward the second position.

A second hole sensor may sense the approach of the magnet when the moving plate backwardly moves. The second hole sensor may be configured to sense a position of the magnet of the driving track as the moving plate is moved from the second position toward the first position.

In the flexible display device according to an embodiment of the present invention, a rotation speed of the driving motor may be controlled in accordance with the signal detected by the first hole sensor and the second hole sensor.

According to an embodiment of the present invention, a driving module is coupled to a body and a moving plate after assembling the driving module so that it is possible to prevent a sliding plate which slidably moves together with a flexible display after assembling the entire flexible display device from being loosen and also prevent the idle operation of the driving gear.

According to an embodiment of the present invention, a left side and a right side of the sliding plate are supported in the driving module and the left side and the right side of the moving plate are supported by the body so that it is possible to provide a flexible display device having excellent lateral balance when the moving plate moves back and forth.

According to an embodiment of the present invention, it is possible to provide a flexible display device having excellent lateral balance while exhibiting sufficient power to move the flexible display, by providing one pair of driving motors and one pair of driving gears so that one pair of driving gears is engaged with one rack disposed at a center.

According to an embodiment of the present invention, a bracket includes the above-described support bracket, a moving rail, and a cover bracket and the cover bracket includes the above-described middle cover bracket and a lower cover bracket so that it is possible to provide a flexible display device having a driving module having excellent assembling rigidity and assembly convenience and slim structure.

According to the embodiment of the present invention, one pair of driving motors and one pair of driving gears are provided, and the rack includes a first rack unit and a second rack unit so that it is possible to provide a flexible display device having a driving module with excellent durability.

According to the embodiment of the present invention, the driving track is disposed to enclose the first support and the second support, and the driving track may form continuous tracks by itself or together with the moving plate so that when the exposed area of the flexible display is increased or reduced, a uniform tension may be applied to the flexible display.

According to the embodiment of the present invention, a back plate which is coupled to an inner surface of the flexible display is provided so that it is possible to provide a flexible display device which easily controls the spring back in a portion where the flexible display is elastically deformed.

According to the embodiment of the present invention, the first support and the second support relatively move to be spaced apart from each other and an elastic body is further provided so that it is possible to provide a flexible display device which prevents the irregularity of the driving track and also prevents unevenness of the flexible display.

According to the embodiment of the present invention, a magnet is provided in a driving track and a first hole sensor and a second hole sensor are provided in a body so that an extendable range of a screen of the flexible display is efficiently limited and a speed of driving motor is controlled to vary in accordance with at a timing when the screen of the flexible display starts to extend, a timing when the expansion is completed, a timing when a screen of the flexible display starts to be reduced, and a timing when the reduction is completed, so that it is possible to provide a flexible display device which smoothly and promptly operates.

More specific effects and additional effects to be achieved by the flexible display device according to the embodiment of the present invention will be described below with reference to the accompanying drawings.

BRIEF DESCRIPTION OF THE DRAWINGS

The foregoing and other objects, features, and advantages of the invention, as well as the following detailed description of the embodiments, will be better understood when read in conjunction with the accompanying drawings. For the purpose of illustrating the invention, there is shown in the drawings an exemplary embodiment that is presently preferred, it being understood, however, that the invention is not intended to be limited to the details shown because various modifications and structural changes may be made therein without departing from the spirit of the invention and within the scope and range of equivalents of the claims. The use of the same reference numerals or symbols in different drawings indicates similar or identical items.

FIG. 1 is a block diagram for explaining a flexible display device according to an embodiment of the present invention.

FIG. 2A is a perspective view illustrating a flexible display device according to another embodiment of the present invention. FIG. 2B is a perspective view illustrating that an area of a flexible display exposed from an upper portion of the flexible display device illustrated in FIG. 2A varies to extend. FIG. 2C is a perspective view illustrating a flexible display device according to still another embodiment of the present invention.

FIG. 3 is an exploded perspective view illustrating a flexible display device illustrated in FIG. 2A.

FIG. 4 is an exploded perspective view illustrating a partial configuration illustrated in FIG. 3.

FIG. 5 is an exploded perspective view illustrating a driving module illustrated in FIG. 4.

FIG. 6 is a cross-sectional view of a flexible display device illustrated in FIG. 2A taken along A-A'.

FIG. 7 is a cross-sectional perspective view of a flexible display device illustrated in FIG. 2A taken along B-B'.

FIG. 8 is a bottom view illustrating a driving module illustrated in FIG. 4.

FIG. 9A is a view conceptually and schematically illustrating a flexible display device according to another embodiment of the present invention. FIG. 9B is a view illustrating that the flexible display device illustrated in FIG. 9A is varied.

FIG. 9C is a view illustrating that configurations of the flexible display device illustrated in FIG. 9A are separated. FIG. 9D is a view illustrating that configurations of a flexible display device according to still another embodiment of the present invention are separated.

FIG. 10 is a view conceptually and schematically illustrating an operation of some components of a flexible display device according to still another embodiment of the present invention.

FIG. 11A is a cross-sectional view of a flexible display device illustrated in FIG. 2A taken along C-C'.

FIG. 11B is a cross-sectional view illustrating that the flexible display device illustrated in FIG. 11A is varied.

FIG. 11C is a cross-sectional view illustrating a flexible display device according to still another embodiment of the present invention.

FIG. 11D is a cross-sectional view illustrating a flexible display device according to still another embodiment of the present invention.

FIGS. 12A and 12B are perspective bottom views illustrating an operation of some components of a flexible display device according to still another embodiment of the present invention.

FIG. 13 is a plan view of a guide plate according to an embodiment of the present invention in which an enlarged shape of a pattern of the guide plate is also illustrated.

FIG. 14 is a plan view of a back plate according to an embodiment of the present invention in which an enlarged shape of a pattern of the back plate is also illustrated.

FIG. 15A is a plan view illustrating some of hinge segments according to an embodiment of the present invention.

FIG. 15B is a bottom view illustrating a part of a body according to an embodiment of the present invention.

FIGS. 16A and 16B are cross-sectional views illustrating an operation of a flexible display device according to still another embodiment of the present invention.

DESCRIPTION OF EMBODIMENTS

Hereinafter, embodiments disclosed the present invention will be described in detail with reference to the accompanying drawings, and the same or similar components are denoted by the same reference, and repeated description thereof will be omitted. Further, such as "module" and a "unit", suffixes for components used in the following description are given or mixed and used by considering easiness in preparing a specification and do not have a meaning or role distinguished from each other in themselves. In describing the embodiment disclosed in the present specification, when it is determined that a detailed description of a related publicly known technology may obscure the gist of the embodiment disclosed in the present specification, the detailed description thereof will be omitted. Further, the accompanying drawings are provided for more understanding of the embodiment disclosed in the present specification, but the technical spirit disclosed in the present invention is not limited by the accompanying drawings. It should be understood that all changes, equivalents, and alternatives included in the spirit and the technical scope of the present invention are included.

Terms including an ordinary number, such as first and second, are used for describing various constituent elements, but the constituent elements are not limited by the terms. The above terms are used only to discriminate one component from the other component.

It should be understood that, when it is described that an element is "coupled" or "connected" to another element, the element may be directly coupled or directly connected to the other element or coupled or connected to the other element through a third element. In contrast, when it is described that an element is "directly coupled" or "directly connected" to another element, it should be understood that no element is present therebetween.

A singular form may include a plural form if there is no clearly opposite meaning in the context.

In the present invention, it should be understood that terminology "include" or "have" indicates that a feature, a number, a step, an operation, a component, a part or the combination those of described in the specification is present, but do not exclude a possibility of presence or addition of one or more other features, numbers, steps, operations, components, parts or combinations, in advance.

A flexible display device (hereinafter, referred to as a 'display device') described in the present specification may include a mobile terminal such as a portable phone, a smart phone, a laptop computer, a digital broadcasting terminal, a personal digital assistant (PDA), a portable multimedia player (PMP), a navigation, a slate PC, a tablet PC, an ultrabook, a wearable device, a smartwatch, a smart glass, a head mounted display (HMD), and the like.

It will be apparent to those skilled in the art that the configuration according to the embodiment disclosed in the present specification may be applied to a fixed terminal such as a digital TV, a desktop computer, a digital signage except for an example that is applied only to a mobile terminal. Hereinafter, in the present invention, for the convenience of description, the mobile terminal will be first described as an example of the display device.

FIG. 1 is a block diagram for explaining a mobile terminal 100 according to the present invention.

The mobile terminal 100 includes a wireless communication unit 110, an input unit 120, a sensing unit 140, an output unit 150, an interface unit 160, a memory 170, a controller 180, and a power supply unit 190. Components illustrated in FIG. 1 are not essential to implement the mobile terminal so that the mobile terminal described in the present invention may include more or fewer components than the components described above.

More specifically, the wireless communication unit 110 among the components may include one or more modules which enable the wireless communication between the mobile terminal 100 and a wireless communication system, between the mobile terminal 100 and another mobile terminal 100, or between the mobile terminal 100 and an external server. Further, the wireless communication unit 110 may include one or more modules which connect the mobile terminal 100 to one or more networks.

The wireless communication unit 110 may include at least one of a broadcasting receiving module 111, a mobile communication module 112, a wireless internet module 113, a near field communication module 114, and a position information module 115.

The input unit 120 may include a camera 121 or an image input unit which inputs an image signal, a microphone 122 or an audio input unit which inputs an audio signal, and a user input unit 123 (for example, a touch key or a mechanical key) which receives information from a user. Voice data or image data collected by the input unit 120 is analyzed to be processed as a control command of the user.

The sensing unit 140 may include one or more sensors which sense at least one of information in the mobile terminal, surrounding environment information around the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121 or a microphone 122), a battery gauge, an environment sensor (for example, a barometer, a hygrometer, a thermometer, a radiation sensor, a thermal sensor, a gas sensor, etc.), and a chemical sensor (for example, an electronic nose, a healthcare sensor, a biometric sensor, etc.). In the meantime, the mobile terminal disclosed in the present specification may combine and utilize information sensed by at least two sensors from the above-mentioned sensors.

The output unit 150 generates outputs related to vision, auditory, or tactile and may include at least one of a display unit 151, a sound output unit 152, a haptic module 153, and an optical output unit 154. The display unit 151 forms a mutual layer structure with a touch sensor or is formed integrally to be implemented as a touch screen. The touch screen simultaneously may serve as a user input unit 123 which provides an input interface between the mobile terminal 100 and the user and provides an output interface between the mobile terminal 100 and the user.

The interface unit 160 serves as a passage with various types of external devices which are connected to the mobile terminal 100. The interface unit 160 may include at least one of a wired/wireless headset port, an external charger port, a wired/wireless data port, a memory card port, a port which connects a device equipped with an identification module, an audio input/output (I/O) port, a video input/output (I/O) port, and an earphone port. The mobile terminal 100 may perform appropriate control related to the connected external device in accordance with the connection of the external device to the interface unit 160.

Further, the memory 170 may store data which supports various functions of the mobile terminal 100. The memory 170 may store a plurality of application programs (or applications) driven in the mobile terminal, data and commands for operations of the mobile terminal 100. At least some of application programs may be downloaded from the external server through wireless communication. Further, at least some of the application programs may reside on the mobile terminal 100 from the time of departure for the basic functions (for example, call incoming, call outgoing, message receiving, or message sending function) of the mobile terminal 100. In the meantime, the application program is stored in the memory 170 and is installed on the mobile terminal 100 to be driven by the controller 180 to perform an operation (or functions) of the mobile terminal.

In addition to the operation related to the application program, the controller 180 may generally control an overall operation of the mobile terminal 100. The controller 180 may process a signal, data, or information which is input or output through the above-described components or drive the application programs stored in the memory 170 to provide or process appropriate information or functions to the user.

Further, in order to drive the application program stored in the memory 170, the controller 180 may control at least some of components described with reference to FIG. 1. Moreover, the controller 180 may combine and operate at least two of components included in the mobile terminal 100 to drive the application program.

The power supply unit 190 is applied with external power or internal power to supply the power to the respective components included in the mobile terminal 100 under the control of the controller 180. The power supply unit 190 includes a battery and the battery may be an embedded battery or a replaceable battery.

At least some of the above-described components may operate in cooperation with each other to implement the operation, the control, or the control method of the mobile terminal according to various embodiments which will be described below. Further, the operation, the control, or the control method of the mobile terminal may be implemented on the mobile terminal by driving at least one application program stored in the memory 170.

Hereinafter, prior to describing various embodiments implemented by the mobile terminal 100 described above, the above-mentioned components will be described in more detail with reference to FIG. 1.

First, the wireless communication unit 110 will be described. The broadcasting receiving module 111 of the wireless communication unit 110 receives a broadcasting signal and/or broadcasting-related information from an external broadcasting management server through a broadcasting channel. The broadcasting channel may include a satellite channel and a ground wave channel. Two or more broadcasting receiving modules for simultaneous broadcasting reception or broadcasting channel switching for at least two broadcasting channels may be provided to the mobile terminal 100.

The broadcasting management sever may refer to a server which generates and transmits a broadcasting signal and/or broadcasting-related information or a server which is supplied with the previously generated broadcasting signal and/or broadcasting-related information to transmit the broadcasting signal and/or the broadcasting-related information to the terminal. The broadcasting signal includes not only a TV broadcasting signal, a radio broadcasting signal, and a data broadcasting signal, but also a broadcasting signal obtained by combining the TV broadcasting signal or the radio broadcasting signal with the data broadcasting signal.

The broadcasting signal may be encoded according to at least one of technical standards for transmitting and receiving a digital broadcasting signal (or a broadcasting schemes, for example, ISO, IEC, DVB, or ATSC) and the broadcasting receiving module 111 may receive the digital broadcasting signal using an appropriate method for the technical specification determined by the technical standards.

The broadcasting-related information may refer to information related to a broadcasting channel, a broadcasting program, or a broadcasting service provider. The broadcasting-related information may also be provided through the mobile communication network. In this case, the broadcasting-related information may be received by the mobile communication module 112.

The broadcasting-related information may exist in various types such as an electronic program guide of digital multimedia broadcasting (DMB) or an electronic service guide of a digital video broadcast-handheld (DVB-H). The broadcasting signal and/or the broadcasting-related information received by the broadcasting receiving module 111 may be stored in the memory 170.

The mobile communication module 112 may transmit and receive a wireless signal with at least one of a base station, an external terminal, and a server on a mobile communication network constructed in accordance with technical standards or communication schemes for the mobile communication (for example, global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSDPA), long term evolution (LTE), long term evolution advanced (LTE-A), etc.).

The wireless signal may include a voice call signal, a video call signal, or various types of data in accordance with transmission or reception of a text/multimedia message.

The wireless internet module 113 refers to a module for wireless internet connection and may be embodied in the mobile terminal 100 or installed at the outside of the mobile terminal 100. The wireless internet module 113 is formed to transmit or receive the wireless signal in the communication network in accordance with wireless internet techniques.

The wireless internet technique includes wireless LAN (WLAN), wireless fidelity (Wi-Fi), Wi-Fi direct, digital living network alliance (DLNA), wireless broadband (WiBro), world interoperability for microwave access (WiMAX), high speed downlink packet access (HSDPA), high speed uplink packet access (HSUPA), long term evolution (LTE), and long term evolution-advanced (LTE-A). The wireless internet module 113 may transmit or receive data in accordance with at least one wireless internet technique within a range including internet techniques which have not been described above.

From the viewpoint that the wireless internet connection by WiBro, HSDPA, HSUPA, GSM, CDMA, WCDMA, LTE, LTE-A, etc. is performed by the mobile communication network, the wireless internet module 113 which performs the wireless internet connection through the mobile communication network may be understood as a type of the mobile communication module 112.

The near field communication module 114 is provided for short range communication and supports the near field communication using at least one of Bluetooth™ radio frequency identification (RFID), infrared data association (IrDA), ultra wideband (UWB), ZigBee, Near Field Communication (NFC), wireless fidelity (Wi-Fi), Wi-Fi Direct, Wireless Universal Serial Bus (Wireless USB). The near field communication module 114 may support wireless communication between the mobile terminal 100 and the wireless communication system, between the mobile terminal 100 and the other mobile terminal 100, or between the mobile terminal 100 and a network in which the other mobile terminal 100 (or external server) is located, through the near field wireless communication network. The near field wireless communication network may be a near field wireless personal communication network.

Here, the other mobile terminal 100 may be a wearable device (for example, a smart watch, a smart glass, or a head mounted display (HMD)) which is capable of exchanging data (or interworking) with the mobile terminal 100 according to the present invention. The near field communication module 114 may detect (or recognize) a wearable device which is communicable with the mobile terminal 100, in the vicinity of the mobile terminal 100. Moreover, when the detected wearable device is authenticated to communicate with the mobile terminal 100 according to the present invention, the controller 180 may transmit at least a part of data processed in the mobile terminal 100 to the wearable device through the near field communication module 114. Therefore, the user of the wearable device may use the data processed in the mobile terminal 100 through the wearable device. For example, according to this, when a phone call is received to the mobile terminal 100, the user may make a phone call through a wearable device or when a message is received to the mobile terminal 100, the user may check the received message through the wearable device.

The position information module 115 is a module for obtaining a position (or a current position) of the mobile terminal and a representative example thereof is a global positioning system (GPS) module or a wireless fidelity (Wi-Fi) module. For example, when the GPS module is utilized, the mobile terminal may obtain the position of the mobile terminal using a signal transmitted from the GPS satellite. As another example, when the Wi-Fi module is utilized, the mobile terminal may obtain the position of the mobile terminal based on information of a wireless access point (AP) which transmits and receives wireless signals with the Wi-Fi module. If necessary, the position information module 115 may perform any function of another module of the wireless communication unit 110 to substitutably or additionally obtain data on the position of the mobile terminal. The position information module 115 is a module used to obtain a position (or a current position) of the mobile terminal and is not limited to a module which directly calculates or obtains the position of the mobile terminal.

Next, the input unit 120 is provided to input video information (or signal), audio information (or signal), data, or information input from the user and in order to input the video information, the mobile terminal 100 may include one or a plurality of cameras 121. The camera 121 processes an image frame such as a still image or a moving image obtained by an image sensor in a video call mode or a photographing mode. The processed image frame may be displayed on the display unit 151 or stored in the memory 170. In the meantime, the plurality of cameras 121 equipped in the mobile terminal 100 may be disposed to form a matrix structure and a plurality of image information having various angles or focal points may be input to the mobile terminal 100 through the cameras 121 which form the matrix structure. Further, the plurality of cameras 121 may be disposed to have a stereo structure to obtain a left image and a right image to implement a stereoscopic image.

The microphone 122 processes an external sound signal as electrical voice data. The processed voice data may be utilized in various forms in accordance with a function which is being performed by the mobile terminal 100 (or an application program which is being executed). In the meantime, in the microphone 122, various noise removal algorithms which remove a noise generated during the process of receiving the external sound signal may be implemented.

The user input unit 123 receives information from the user and when the information is input through the user input unit 123, the controller 180 may control the operation of the mobile terminal 100 so as to correspond to the input information. The user input unit 123 may include a mechanical input unit (or a mechanical key, for example, a button located on a front, rear, or side surface of the mobile terminal 100, a dome switch, a jog wheel, a jog switch, etc.) and a touch type input unit. For example, the touch type input unit may be formed by a virtual key, a soft key, or a visual key which is displayed on the screen through a software process or a touch key which is disposed on a portion other than the touch screen. In the meantime, the virtual key or the visual key may be displayed on the touch screen with various shapes, and for example, may be formed by graphics, texts, icons, video, or a combination thereof.

In the meantime, the sensing unit 140 senses at least one of information in the mobile terminal, surrounding environment information around the mobile terminal, and user information and generates a sensing signal corresponding to the information. The controller 180 may control the driving or the operation of the mobile terminal 100 or perform data processing, functions, or operations related to the application program installed in the mobile terminal 100, based on the sensing signal. Representative sensors among various sensors which may be included in the sensing unit 140 will be described in more detail.

First, the proximity sensor 141 is a sensor which senses the presence of an object which approaching a predetermined sensing surface or nearby objects using an electromagnetic field force or infrared ray without any mechanical contact. The proximity sensor 141 may be disposed in an internal area of the mobile terminal which is enclosed by the above-described touch screen or in the vicinity of the touch screen.

Examples of the proximity sensor 141 may include a transmission type photoelectric sensor, a direct reflection type photoelectric sensor, a mirror reflection type photoelectric sensor, a high frequency oscillation type proximity sensor, a capacitive proximity sensor, a magnetic proximity sensor, an infrared proximity sensor, etc. When the touch screen is a capacitive type, the proximity sensor 141 may be configured to detect the proximity of the object with a change in the electric field in accordance with the proximity of the object having conductivity. In this case, the touch screen (or the touch sensor) itself may be classified as a proximity sensor.

In the meantime, for the convenience of description, when an object approaches onto the touch screen without being contacted to be recognized that the object is located on the touch screen, it is referred to as a "proximity touch" and when the object actually touches the touch screen, it is referred to as "contact touch". A position that the object proximately touches the touch screen refers to a position that when the object proximately touches, the object vertically corresponds to the touch screen. The proximity sensor 141 may sense proximate touch and a proximate touch pattern (for example, a proximate touch distance, a proximate touch direction, a proximate touch speed, a proximate touch time, a proximate touch position, a proximate touch movement state, etc.). In the meantime, as described above, the controller 180 may process data (or information) corresponding to the proximate touch operation and the proximate touch pattern sensed by the proximity sensor 141 and may further output visual information corresponding to the processed data on the touch screen. Furthermore, the controller 180 may control the mobile terminal 100 to process different operation or data (or information) depending on whether the touch on the same point on the touch screen is proximity touch or contact touch.

The touch sensor senses touch (or a touch input) applied to the touch screen (or the display unit 151) using at least one of various touch types such as a resistive film type, a capacitive type, an infrared type, an ultrasonic type, and a magnetic field type.

For example, the touch sensor may be configured to convert a change of a pressure which is applied to a specific portion of the touch screen or a capacitance which is generated in a specific portion into an electrical input signal. The touch sensor may be configured to detect a position and an area where a touch subject which applies touch onto the touch screen is touched on the touch sensor and a capacitance at the time of touch. Here, the touch subject is an object which applies touch to the touch sensor and for example, may include a finger, a touch pen, a stylus pen, a pointer, etc.

As described above, when there is the touch input to the touch sensor, corresponding signals are transmitted to a touch controller. The touch controller processes the signal(s) and then transmits corresponding data to the controller 180. By doing this, the controller 180 may confirm which area of the display unit 151 is touched. Here, the touch controller may be a separate component from the controller 180 or the controller 180 itself.

In the meantime, the controller 180 may perform different control or the same control depending on a type of a touch subject which touches the touch screen (or a touch key equipped other than the touch screen). Whether to perform the different control or the same control depending on the type of touch subject may be determined in accordance with an operating state of the current mobile terminal 100 or an application program which is being executed.

In the meantime, a touch sensor and a proximity sensor described above may independently or combinationally sense various types of touch on the touch screen, such as short (or tab) touch, long touch, multi touch, drag touch, flick touch, pinch-in touch, pinch-out touch, swipe touch, or hovering touch.

The ultrasonic sensor may recognize position information of a sensing object using an ultrasonic wave. In the meantime, the controller 180 may calculate a position of a wave generating source by information sensed by the optical sensor and the plurality of ultrasonic sensors. A position of the wave generating source may be calculated using a property that the light is much faster than the ultrasonic wave, that is, a time that light reaches the optical sensor is much faster than a time that the ultrasonic wave reaches an ultrasonic sensor. More specifically, the position of the wave generating source may be calculated using a time difference from a time that the ultrasonic wave reaches, with respect to light which serves as a reference signal.

In the meantime, as seen from the configuration of the input unit 120, the camera 121 includes at least one of a camera sensor (for example, a CCD or a CMOS), a photo sensor (or an image sensor), and a laser sensor.

The camera 121 and the laser sensor may be combined to sense a touch of a sensing object for a three-dimensional stereoscopic image. The photo sensor which is laminated on a display element is configured to scan a motion of a sensing object proximate to the touch screen. More specifically, the photo sensor is formed by mounting photo diodes and transistors (TR) in rows/columns to scan contents which are disposed on the photo sensor using an electrical signal which changes in accordance with an amount of light applied to the photo diode. That is, the photo sensor calculates a coordinate of a sensing object in accordance with a changed amount of light and position information of the sensing object may be obtained through the coordinate.

The display unit 151 displays (outputs) information processed in the mobile terminal 100. For example, the display unit 151 may display execution screen information of an application program driven in the mobile terminal 100 and user interface (UI) and graphic user interface (GUI) information in accordance with the execution screen information.

Further, the display unit 151 may be configured as a stereoscopic display unit which displays a stereoscopic image.

A three-dimensional display type such as a stereoscopic type (a glass type), an autostereoscopic type (a glass-free type), a projection type (a holographic type) may be applied to the stereoscopic display unit.

The sound output unit 152 may output audio data received from the wireless communication unit 110 or stored in the memory 170 in a call signal reception mode, a phone-call mode or a recording mode, a voice recognition mode, or a broadcasting reception mode. The sound output unit 152 may also output a sound signal related to a function (for example, a call signal reception sound or a message reception sound) performed in the mobile terminal 100. Such a sound output unit 152 may include a receiver, a speaker, a buzzer, etc.

The haptic module 153 may generate various tactile effects that the user may feel. A representative example of the tactile effect generated by the haptic module 153 may be vibration. An intensity and a pattern of the vibration generated in the haptic module 153 may be controlled by the selection of the user or a setting of the controller 180. For example, the haptic module 153 may compose different vibrations to output the composed vibrations or sequentially output the different vibrations.

In addition to the vibration, the haptic module 153 generates various tactile effects such as effects by a pin arrangement which vertically moves to a contact skin surface, an injection force or a suction force of air through an injection port or a suction port, grazing on a skin surface, electrode contact, or stimulation of an electrostatic force or effects of reproducing a cold or hot sensation using a heat absorbing or heat emitting element.

The haptic module 153 may not only transmit a tactile effect by means of direct contact, but also implement to allow the user to feel the tactile effect by muscular sensation of a finger or an arm. Two or more haptic modules 153 may be provided in accordance with a configuration aspect of the mobile terminal 100.

The optical output unit 154 outputs a signal for notifying occurrence of an event using light of a light source of the mobile terminal 100. Examples of event generated in the mobile terminal 100 may be message reception, call signal reception, missed call, alarm, schedule notification, email reception, information reception through an application, etc.

The signal output from the optical output unit 154 is implemented as the mobile terminal emits single color or a plurality of color light to a front surface or a rear surface. When the mobile terminal senses the event confirmation of the user, the signal output may be completed.

The interface unit 160 serves as a passage with all external devices which are connected to the mobile terminal 100. The interface unit 160 receives data from the external device or is supplied with the power source to transmit the power source to each component in the mobile terminal 100 or transmits data in the mobile terminal 100 to the external device. For example, the interface unit 160 may include a wired/wireless headset port, an external charger port, a wired/wireless data port, a memory card port, a port which connects a device equipped with an identification module, an audio input/output (I/O) port, a video input/output (I/O) port, an earphone port, etc.

In the meantime, the identification module is a chip in which various information for authenticating a usage right of the mobile terminal 100 is stored and may include a user identity module (UIM), a subscriber identify module (SIM) an universal subscriber identify module (USIM), etc. The device with an identification module (hereinafter, "identification device" may be manufactured as a smart card type. Therefore, the identification device may be connected to the terminal 100 through the interface unit 160.

When the mobile terminal 100 is connected to an external cradle, the interface unit 160 may serve as a passage through which the power is supplied from the cradle to the mobile terminal 100 or a passage through which various command signals are transmitted to the mobile terminal 100. Various command signals or the power input from the cradle may operate a signal for recognizing that the mobile terminal 100 is precisely mounted in the cradle.

The memory 170 may store a program for an operation of the controller 180 or temporarily store input/output data (for example, a phone book, a message, a still image, a moving image, etc.). The memory 170 may store data on a vibration or a sound of various patterns output when the touch is input onto the touch screen.

The memory 170 may include at least one type of storage medium of a flash memory type, a hard disk type, a solid state disk (SSD) type, a silicon disk drive (SDD) type, a multimedia card micro type, and card type memories (for example, SD or XD memory and the like), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. The mobile terminal 100 may operate in association with a web storage which performs a storage function of the memory 170 on the Internet.

In the meantime, as described above, the controller 180 may control an operation related to the application program and an overall operation of the mobile terminal 100. For example, when the state of the mobile terminal satisfies a predetermined condition, the controller 180 may execute or release a locking state which restricts an input of a control command of a user for the applications.

Further, the controller 180 may perform control and processing related to voice call, data communication, and video call or perform a pattern recognition process which recognizes a handwriting input or a picture drawing input performed on the touch screen as a text or an image, respectively. Moreover, the controller 180 may control any one or a combination of a plurality of components described above to implement various embodiments which will be described below on the mobile terminal 100 according to the present invention.

The power supply unit 190 is applied with an external power or an internal power by the control of the controller 180 to supply the power required for operations of components. The power supply unit 190 includes a battery and the battery may be a chargeable embedded battery and detachably coupled to the terminal body to be charged.

Further, the power supply unit 190 includes a connection port and the connection port may be configured as one example of an interface unit 160 to which an external charger which supplies a power to charge a battery is electrically connected.

As another example, the power supply unit 190 may be configured to wirelessly charge the battery without using the connection port. In this case, the power supply unit 190 may receive the power using one or more of an inductive coupling method based on a self-induction phenomenon and a magnetic resonance coupling method based on an electromagnetic resonance phenomenon.

In the meantime, hereinafter, various embodiments may be implemented in a recording medium readable by a computer or a similar device using hardware, software, or a combination thereof.

The display unit 151 may include at least one of a liquid crystal display (LCD), a thin film transistor liquid crystal display (TFT LCD), an organic light emitting diode (OLED), a flexible display, a three-dimensional display (3D display), and an electronic ink display (e-ink display).

Further, two or more display units 151 may be provided in accordance with an implementation type of the mobile terminal 100. In this case, a plurality of display units may be disposed to be spaced apart from each other or integrally disposed on one surface of the mobile terminal 100 or may be disposed on different surfaces.

The display unit 151 may include a touch sensor which senses touch on the display unit 151 so as to receive the control command by the touch method. Therefore, when the touch is made on the display unit 151, the touch sensor senses the touch and the controller 180 generates a control command corresponding to the touch based on the touch. Contents input by the touch method may be letters or numbers, instructions in various modes, menu items which may be designated, or the like.

The microphone 122 is configured to receive a voice of the user or other sounds. The microphone 122 is equipped in a plurality of locations to receive stereo sounds.

The interface unit 160 serves as a passage through which the mobile terminal 100 is connected to the external device. For example, the interface unit 160 may be at least one of a connection terminal for connection with other devices (for example, an earphone or an external speaker), a port for near field communication (for example, an infrared port (IrDA port), a Bluetooth port, a wireless LAN port, etc.), and a power supply terminal for supplying a power to the mobile terminal 100. The interface unit 160 may be implemented as a socket type which accommodates an external card such as a subscriber identification module (SIM), a user identity module (UIM), and a memory card for information storage.

At least one antenna for wireless communication may be provided in a terminal body. The antenna may be embedded in the terminal body or formed in a case. For example, the antenna which forms a part of the broadcasting receiving module 111 (see FIG. 1) may be configured to be drawn from the terminal body. Alternatively, the antenna is formed to be a film type to be attached onto an inner surface of a housing or a case including a conductive material may serve as an antenna.

The terminal body includes the power supply unit 190 (see FIG. 1) which supplies the power to the mobile terminal 100. The power supply unit 190 may be embedded in the terminal body or include a battery 191 which is configured to be detachable at the outside of the terminal body.

The battery 191 may be configured to be supplied with the power through a power cable connected to the interface unit 160. Further, the battery 191 may be configured to be wirelessly chargeable by a wireless charging device. The wireless charging may be implemented by a self-induction method or a resonance method (magnetic resonance method).

An accessory which protects an outer appearance or supports or extends the function of the mobile terminal 100 may be added to the mobile terminal 100. An example of the accessory may include a cover or a pouch which covers at least one surface of the mobile terminal 100 or accommodates the mobile terminal 100. The cover or the pouch may interwork with the display unit 151 to extend the function of the mobile terminal 100. Another example of the accessory may include a touch pen which supports or extends a touch input on the touch screen.

FIG. 2A is a perspective view illustrating a flexible display device 1 according to another embodiment of the present invention. FIG. 2B is a perspective view illustrating that an area of a flexible display 500 exposed from an upper portion of the flexible display device 1 illustrated in FIG. 2A varies to extend.

In the description of the embodiments of the present invention, it is understood that a front-rear direction is a direction that the moving plate 300 reciprocates with respect to the body 200, an up-down direction is a direction which is perpendicular to a surface formed by the moving plate 300, and a left-right direction is a direction which is orthogonal to the front-rear direction and the up-down direction.

Hereinafter, in the description of the embodiments of the present invention, an X-direction, a Y-direction, and a Z-direction illustrated in the drawings are orthogonal to each other. In the description of the display device 1 according to the embodiments of the present invention, it is understood that the front-rear direction is parallel to the X-direction, the up-down direction is parallel to the Z-direction, and the left-right direction is parallel to the Y-direction.

The inside refers to a relative inside of the display device 1 and the outside refers to a relative outside of the display device 1.

The display device 1 according to the embodiment of the present invention includes a flexible display 500 which is deformable by an external force.

The deformation may be at least one of warping, bending, folding, twisting, rolling, and spreading of the display module. The deformable display module may be referred to as a "flexible display". Here, the flexible display 500 may include all a general flexible display, an electronic paper (e-paper) and a combination thereof.

The general flexible display refers to a durable display which is manufactured on a thin and flexible substrate which can be warped, bent, folded, twisted, rolled, and spread like a paper while maintaining a characteristic of a flat panel display of the related art to have a lightweight and is not easily broken.

Further, the electronic paper is a display technique to which a characteristic of a general ink is applied, but the electronic paper uses reflection light which is different from the flat panel display of the related art. The electronic paper may change information using a twist ball or electrophoresis using a capsule.

Information displayed on the flexible display 500 may include visual information which is output on a curved surface. The visual information is implemented by independently controlling the light emission of unit pixels (sub pixels) disposed in a matrix. The unit pixel refers to a minimum unit which implements one color.

A part of the flexible display 500 may be not flat but may be bent. In this case, when an external force is applied to the flexible display 500, a part of the flexible display 500 may be deformed into a flat state or a less bent state or a more bent state.

In the meantime, the flexible display 500 is combined with a touch sensor to implement a flexible touch screen. When the touch is made on the flexible touch screen, the controller 180 (see FIG. 1) performs control corresponding to the touch input. The flexible touch screen is formed such that the touch input is sensed while a part of the flexible display 500 is spread or bent.

In the meantime, the display device 1 according to the modified example may include a deformation sensing unit which senses deformation of the flexible display 500. The deformation sensing unit may be included in the sensing unit 140 (see FIG. 1).

The deformation sensing unit may be provided in the flexible display 500 or the body 200 to sense information related to the deformation of the flexible display 500. Here, the information related to the deformation may be a deformed direction of the flexible display 500, how much the flexible display 500 deformed, the deformed position, the deformed time, an acceleration that the deformed flexible display 500 is restored, and the like. Further, various information which can be sensed by the bending of the flexible display 500 may also be included.

Further, the controller 180 (see FIG. 1) may change information disposed on the flexible display 500 or generate a control signal for controlling a function of the display device 1, based on the information related to the deformation of the flexible display 500 sensed by the deformation sensing unit.

The deformation of the state of the flexible display 500 is not limited to the deformation by the external force. For example, when a part of the flexible display 500 is unfolded, the part may be deformed to be bent by the command of the user or an application.

The body 200 may form an overall outer appearance of the display device 1, may be relatively solid, and formed of plastic or metal or formed to include the same. Other components which form the display device 1 may be coupled to the body 200.

The body 200 may be formed to have various shapes which support other configurations coupled thereto.

The body 200 may be entirely formed to have a flat shape or curved shape like a curved surface. The body 200 may be entirely filled therein or a part thereof is not filled. Surfaces which form the body 200 may be flat surfaces or curved surfaces. When there is an edge of the body, the edge may form a straight line or a curved line. Further, when there is a vertex of the body 200, the vertex may be a right angle, an acute angle, or an obtuse angle.

For example, as illustrated in FIGS. 2A and 2B, when viewed from above (Z-direction), the body 200 entirely forms a quadrangular shape or also entirely forms a flat shape.

The flexible display 500 is coupled onto the body 200 so that a part thereof is exposed in the upward direction (Z-direction) and the other part is not exposed in the upward direction. As illustrated in FIG. 2A, when a part of an outer surface of the flexible display 500 is exposed in the upward direction, it is referred to as a first state, or a first position (see FIG. 2A).

When the flexible display 500 is deformed while a front end 500*a* of the flexible display 500 exposed in the upward direction further moves to the front side (X-direction), an area of the flexible display 500 which is exposed in the upward direction may be increased. As illustrated in FIG. 2B, when the flexible display 500 in the first state moves to the front side so that the exposed area of the flexible display 500 is extended, it is referred to as a second state, or a second position.

As described above, the shape of the display device 1 according to the embodiment of the present invention may vary between the first state and the second state. When viewed from above, the flexible display 500 having a relatively small size (area) is exposed in the first state and the flexible display 500 having a relatively large size (area) is exposed in the second state.

In the display device 1 according to the embodiment of the present invention, a front end portion 500a of the flexible display 500 which is exposed in the upward direction is not visually blocked, but a rear end portion 500b is visually blocked (see FIG. 2A). That is, a part of the flexible display 500 may be blocked by a rear border of the body 200. In this case, the flexible display 500 may not be visually exposed on a lower surface (a lower portion of the body 200, an opposite side in the Z-direction) of the display device 1.

When viewed from above, a left border and a right border of the body 200 may be formed to guide the flexible display 500 to smoothly move in the front-rear direction.

For example, a first holder 240 in which a first rail 241 open toward the right side is formed at the left border of the body 200 is formed along the front-rear direction and a second holder 250 in which a second rail 251 open toward the left side is formed at a right border of the body 200 is formed along the front-rear direction.

A left edge of the flexible display 500 or a left edge (a first slider 330) of the moving plate 300 to be described below to which the flexible display 500 is coupled may be inserted in the first rail 241. A right edge of the flexible display 500 or a right edge (a second slider 340) of the moving plate 300 to be described below to which the flexible display 500 is coupled may be inserted in the second rail 251.

In the display device 1 according to the embodiment of the present invention, a front end portion 500a of the flexible display 500 which is exposed in the upward direction may not be blocked, and the rear end portion 500b may not be visually blocked (see FIG. 2C). That is, the flexible display 500 which is entirely flat is exposed in the upward direction and the rear end portion 500b of the flexible display 500 which has a predetermined curvature and is rounded may be exposed at the rear side.

Moreover, at least a part of the flexible display 500 may be visually exposed on the rear surface (lower portion of the body 200) of the display device 1 and a lower surface of the body 200 does not visually shield the flexible display 500 so that the flexible display 500 may also be exposed from the lower portion.

FIG. 3 is an exploded perspective view illustrating a flexible display device 1 illustrated in FIG. 2A.

The body 200 includes a center body 230, a first holder 240, and a second holder 250.

Further, the body 200 may include a first frame 260, a second frame 270, a third frame 234, and a fourth frame 235.

Further, the body 200 may include a back cover 233. The back cover 233 may form a rear-most surface of the display device 1.

The back cover 233 includes a window 233a. The window 233a may be formed as a hole which passes through the back cover 233 or a transparent panel.

According to an embodiment of the present invention, the flexible display 500 may be exposed on a lower surface of the display device 1, for example, the flexible display 500 may be exposed from the lower portion through the window 233a.

The center body 230 may form a center of the body 200 and include various parts of the display device 1.

The center body 230 may include a lower cover 231 and an upper cover 232.

The lower cover 231 and the upper cover 232 are formed to be coupled to each other and the components of the display device 1 may be accommodated in an inner space formed when the lower cover 231 and the upper cover 232 are coupled to each other.

For example, as illustrated in FIG. 3, a main PCB (P), a battery (B), a speaker (S), and a camera (C) may be accommodated and coupled between the lower cover 231 and the upper cover 232.

In the flexible display device 1 according to the embodiment of the present invention, a bracket accommodating hole 232a and a wing seating groove 232b may be formed in the body 200. The bracket accommodating hole 232a is formed to pass through the body 200 to accommodate the bracket 601 of a driving module 600 to be described below. The wing seating groove 232b is formed as a concave groove so that a wing unit 632 to be described below is seated in the vicinity of the bracket accommodating hole 232a. The wing unit 632 is seated in the wing seating groove 232b and then may be fastened by a bolt.

In a specific embodiment of the present invention, the bracket accommodating hole 232a and the wing seating groove 232b may be formed on the center body 230 or also formed on the upper cover 232.

The first frame 260, the second frame 270, the third frame 234, and the fourth frame 235 are connected to each other to form a rectangular frame shape.

The first frame 260 forms a left frame of the body 200, the second frame 270 forms a right frame of the body 200, the third frame 234 forms a front frame of the body 200, and the fourth frame 235 forms a rear frame of the body 200.

The third frame 234 is coupled to a front side of the center body 230 and the fourth frame 235 may be coupled to a rear side of the center body 230.

The first holder 240 may form a left edge of the body 200 together with the first frame 260.

In the first holder 240, the first rail 241 which is parallel to the front-rear direction is formed. The first rail 241 may be formed in an inner surface of the first holder 240 to have a concave groove shape. A first slider 330 which forms an edge of the moving plate 300 is inserted into the first rail 241 and the moving plate 300 may stably move in the front-rear direction with respect to the body 200.

First auxiliary rails 242 and 243 may be formed in the first holder 240. The first auxiliary rails 242 and 243 are formed on the inner surface of the first holder 240 like a concave groove and are connected to the first rail 241. That is, the first rail 241 and the first auxiliary rails 242 and 243 are continuously formed.

The first auxiliary rails 242 and 243 may be divided into a first straight section 242 and a first curved section 243. The first straight section 242 is parallel to the first rail 241 and is formed along the front-rear direction.

The first curved section 243 is located at a rear end of the first straight section 242 to form a semicircular shape and forms a portion which naturally connects the first straight section 242 and the first rail 241.

An edge portion of a driving track 400 is inserted in the first auxiliary rails 242 and 243, and specifically, left ends (for example, 412a) of hinge segments 411, 412, and 413 are inserted (see FIG. 7).

The first auxiliary rails 242 and 243 and the first rail 241 are continuously formed so that the left end 412a of the hinge segments 412 may enter the first rail 241 via the first auxiliary rails 242 and 243.

The first frame 260 is coupled at an outside of the first holder 240.

The second holder 250 is spaced apart from the first holder 240 to be parallel and an inner surface may be symmetrical to the first holder 240.

The second holder 250 may form a right edge of the body 200 together with the second frame 270.

In the second holder 250, the second rail 251 which is parallel to the front-rear direction is formed. The second rail 251 may be formed in an inner surface of the second holder 250 to have a concave groove shape. A second slider 340 which forms an edge of the moving plate 300 is inserted into the second rail 251 and the moving plate 300 may stably move in the front-rear direction with respect to the body 200.

Second auxiliary rails 252 and 253 may be formed in the second holder 250. The second auxiliary rails 252 and 253 are formed on the inner surface of the second holder 250 like a concave groove and are connected to the second rail 251. That is, the second rail 251 and the second auxiliary rails 252 and 253 are continuously formed.

The second auxiliary rails 252 and 253 may be divided into a second straight section 252 and a second curved section 253. The second straight section 252 is parallel to the second rail 251 and is formed along the front-rear direction.

The second curved section 253 is located at a rear end of the second straight section 252 to form a semicircular shape and forms a portion which naturally connects the second straight section 252 and the second rail 251.

An edge portion of the driving track 400 is inserted in the second auxiliary rails 252 and 253, and specifically, right ends (for example, 412b) of hinge segments 411, 412, and 413 are inserted (see FIG. 7).

The second auxiliary rails 252 and 253 and the second rail 251 are continuously formed so that the right end 412b of the hinge segments 412 may enter the second rail 251 via the second auxiliary rails 252 and 253.

The second frame 270 is coupled at an outside of the second holder 250.

The center body 230 is formed to connect the first holder 240 and the second holder 250. The first holder 240 is coupled to a left end of the center body 230 and the second holder 250 is coupled to a right end of the center body 230.

FIG. 4 is an exploded perspective view illustrating a partial configuration illustrated in FIG. 3.

In the display device 1 according to the embodiment of the present invention, the moving plate 300 may be formed of a rigid material to maintain the shape. The moving plate 300 may be formed of metal or plastic or formed to include the same.

In the display device 1 according to the embodiment of the present invention, the moving plate 300 may be formed to entirely have a flat plate along the front-rear direction and the left-right direction.

The flexible display 500 is laminated on an outer surface (upper surface) of the moving plate 300 to be coupled thereto. The outer surface of the moving plate 300 may be entirely flat along the front-rear direction and the left-right direction.

The flexible display 500 may be directly coupled to the outer surface 310 of the moving plate 300 or coupled to the outer surface 310 of the moving plate 300 by means of another unit.

In the embodiment of the present invention, a back plate 430 may be interposed between the flexible display 500 and the moving plate 300 to be coupled thereto. That is, the back plate 430 is laminated on an inner surface of the flexible display 500 to be coupled and the back plate 430 is laminated on the outer surface 310 of the moving plate 300 to be coupled so that the flexible display 500 and the moving plate 300 may be coupled to each other.

A module coupling groove 321 which is a concave groove may be formed in the inner surface (lower surface) 320 of the moving plate 300. The module coupling groove 321 is formed at a center of the left-right direction of the moving plate 300. The sliding plate 650 of the driving module is seated on the module coupling groove 321 so that the sliding plate 650 and the moving plate 300 may be coupled. The sliding plate 650 and the moving plate 300 may be coupled by a fastening unit such as a bold or a rivet.

A guide groove 322 may be formed on the inner surface 320 of the moving plate 300. One pair of guide grooves 322 may be provided at left and right sides of the module coupling groove 321.

A first slider 330 which moves along the first rail 241 is formed at one side of the moving plate 300 and a second slider 340 which moves along the second rail 251 is formed at the other side.

FIG. 5 is an exploded perspective view illustrating a driving module 600 illustrated in FIG. 4, FIG. 6 is a cross-sectional view of a flexible display device 1 illustrated in FIG. 2A taken along A-A', FIG. 7 is a cross-sectional view of a flexible display device 1 illustrated in FIG. 2A taken along B-B', and FIG. 8 is a bottom view illustrating a driving module 600 illustrated in FIG. 4.

In the display device 1 according to the embodiment of the present invention, the driving module 600 may be formed to move the moving plate 300 with respect to the body 200. Specifically, the driving module 600 is formed to reciprocate the moving plate 300 in the front-rear direction with respect to the body 200.

The driving module 600 includes a bracket 601, a rack 660, a sliding plate 650, driving motors 602a and 602b, and driving gears 603a and 603b.

The driving motors 602a and 602b are coupled to the bracket 601.

The driving gears 603a and 603b are coupled to rotary shafts 602aa and 602ba of the driving motors 602a and 602b.

The driving gears 603a and 603b are configured to have a shape of a general gear and linearly moves the rack 660 while transmitting a rotational power of the driving motors 602a and 602b to the rack 660.

In the driving gears 603a and 603b, gears are repeatedly formed along an outer circumferential surface and the gears of the driving gears 603a and 603b are engaged with the gear 661 of the rack 660.

The driving motors 602a and 602b may be configured to have a shape of a normal motor which rotates by an electric energy and are configured as step motors. The driving motors 602a and 602b may be directly coupled to the driving gears 603a and 603b to rotate the driving gears 603a and 603b or rotate the driving gears 603a and 603b by means of another gear.

The driving gears 603a and 603b may be located in front of the first support 210 in the display device 1 and the driving gears 603a and 603b may be formed at a similar point to the second support 220 with respect to the front-rear direction (see FIGS. 12A and 12B).

In the flexible display device 1 according to the embodiment of the present invention, when one driving module 600 is formed, one pair of driving motors 602a and 602b and one pair of driving gears 603a and 603b may be provided.

One pair of driving motors 602a and 602b are disposed along the left-right direction and each rotary shaft 602aa and 602ba of the driving motors 602a and 602b may be parallel to the left-right direction.

In this case, one pair of driving gears 603a and 603b may be disposed between one pair of driving motors 602a and 602b.

With respect to the vertical axis, one pair of driving motors 602a and 602b is rotationally symmetric to each other and one pair of driving gears 603a and 603b is rotationally symmetric to each other.

The gear 661 may be repeatedly formed along the moving direction of the sliding plate 650, on the lower surface of the sliding plate 650. That is, the gear 661 may be repeatedly formed along the front-rear direction, on the lower surface of the sliding plate 650.

The rack 660 which forms the gear 661 in the sliding plate 650 may be integrally formed with the sliding plate 650 or separately formed and then coupled to the sliding plate 650.

The sliding plate 650 may be formed of a rigid material to stably maintain the shape with a relatively small thickness. The sliding plate 650 may be formed of a metal plate. The sliding plate 650 may be formed of stainless steel.

The sliding plate 650 may be entirely formed to have a rectangular plate shape and left and right sides are symmetric to each other along the front-rear direction.

A left edge 651 is provided at a left side of the sliding plate 650 and a right edge 652 is provided at a right side. The left edge 651 and the right edge 652 protrude to be opposite to each other.

The left edge 651 of the sliding plate 650 has a uniform cross-section along the front-rear direction and a left stopper 653 which protrudes to the left side is formed at a front end of the left edge 651.

The right edge 652 of the sliding plate 650 has a uniform cross-section along the front-rear direction and a right stopper 654 which protrudes to the right side is formed at a front end of the right edge 652.

The outer surface of the sliding plate 650 is in close contact with the inner surface of the moving plate 300.

When the rack 660 is separately formed from the sliding plate 650, the rack 660 may be formed of engineering plastic, for example, polyacetal, polycarbonate, polyamide, polyphenylene oxide, or a combination thereof or include the same. The rack 660 may be formed of polyacetal to reduce the friction against the driving gears 603a and 603b and to be smoothly driven.

The gear 661 is repeatedly formed in the rack 660 along the front-rear direction.

The rack 660 is coupled to the center of the left-right direction of the sliding plate 650.

With this configuration, the rack 660 having a precise gear 661 may be easily formed and the sliding plate 650 having excellent rigidity may be formed.

In the display device 1 according to the embodiment of the present invention, for the purpose of smooth movement of the moving plate 300, a gear module value of the gear of the rack 660 and the driving gears 603a and 603b may be 0.3 mm.

In the flexible display device 1 according to the embodiment of the present invention, in order to improve the durability of the rack 660, when the pair of driving gears 603a and 603b is referred to as a first driving gear 603a and a second driving gear 603b, the rack 660 may include a first rack unit 661a and a second rack unit 661b.

In the rack 660, the first rack unit 661a forms an area which is engaged with the first driving gear 603a and the second rack unit 661b forms an area which is engaged with the second driving gear 603b and does not overlap the first rack unit 661a.

The bracket 601 is fixedly coupled to the body 200. Specifically, the bracket 601 may be fixedly coupled to the center body 230.

The bracket 601 may include a support bracket 610, moving rails 620a and 620b, and a cover bracket 601a.

The support bracket 610 may be formed of a rigid material to stably maintain the shape with a relatively small thickness. The support bracket 610 may be formed of a metal plate. The support bracket 610 may be formed of stainless steel.

Third accommodating holes 613a and 613b in which a part of the driving motors 602a and 602b is accommodated may be formed in the support bracket 610. The third accommodating holes 613a and 613b form holes which pass through the support bracket 610 in the up-down direction.

The support bracket 610 may include the third accommodating holes 613a and 613b in which a part of the driving motors 602a and 602b is accommodated and third locking units 614a and 614b which form the surrounding of the third accommodating holes 613a and 613b and prevent the driving motors 602a and 602b from being upwardly deviated.

The driving gears 603a and 603b are engaged with the rack 660 through the third accommodating holes 613a and 613b.

Rail coupling units 611 and 612 may be provided at the left and right sides of the support bracket 610. That is, in the support bracket 610, one pair of rail coupling units 611 and 612 is provided to be symmetrical to each other.

One pair of rail coupling units 611 and 612 is upwardly bent in the support bracket 610 and then bent again to face each other so that the rail coupling units 611 and 612 may be stably coupled to the moving rails 620a and 620b to be described below.

One pair of moving rails 620a and 620b is provided and is symmetrically coupled to the rail coupling units 611 and 612, respectively. The moving rails 620a and 620b may be formed of engineering plastic, for example, polyacetal, polycarbonate, polyamide, polyphenylene oxide, or a combination thereof or include the same. The moving rails 620a and 620b may be formed of polyacetal to reduce the friction against the sliding plate 650 and to be smoothly driven.

The left moving rail 620a is coupled to the left rail coupling unit 611. The left moving rail 620a may be coupled to the left rail coupling unit 611 so as to be locked, forcibly fitted, slidably coupled (in the front-rear direction), or the like. After being coupled to the left rail coupling unit 611, the left rail coupling unit 611 is coupled to block the deviation from the support bracket 610 and specifically, coupled to the left rail coupling unit 611 with a structure in which the deflection to the left direction from the support bracket 610 is blocked.

A left grip unit 621a having a concave groove shape is provided in the left moving rail 620a and a left edge 651 of the sliding plate 650 is inserted in the left grip unit 621a.

The right moving rail 620b may be formed to be symmetric to the left moving rail 620a and the coupling between the right moving rail 620b and the right rail coupling unit 612 may be the same (symmetric to) as the coupling between the left moving rail 620a and the left rail coupling unit 611.

A right grip unit 621*b* having a concave groove shape is provided in the right moving rail 620*b* and a right edge 651 of the sliding plate 650 is inserted in the right grip unit 621*b*.

One pair of moving rails 620*a* and 620*b* is coupled to the support bracket 610 and the sliding plate 650 disposed in front of the support bracket 610 moves to the rear side to insert both edges 651 and 652 of the sliding plate 650 in each of the grip units 621*a* and 621*b* of the moving rails 620*a* and 620*b*. Therefore, the support bracket 610, the moving rails 620*a* and 620*b*, and the sliding plate 650 are coupled.

Further, a left stopper 653 is locked to a front edge of the left grip unit 621*a* of the left moving rail 620*a* and a right stopper 654 is locked to a front edge of the right grip unit 621*b* of the right moving rail 620*b* so that the backward deviation of the sliding plate 650 from the support bracket 610 may be blocked.

The cover bracket 601*a* is coupled to the support bracket 610 and supports the driving motors 602*a* and 602*b*. The cover bracket 601*a* may be formed of general plastic and formed by injection molding.

The cover bracket 601*a* is divided into a middle cover bracket 630 and a lower cover bracket 640.

The middle cover bracket 630 is formed to be coupled to the support bracket 610 below the support bracket 610. In a state in which the middle cover bracket 630 is in close contact with the support bracket 610, the middle cover bracket 630 may be fixed to the support bracket 610 using a plurality of fastening units R such as bolts or rivets.

The middle cover bracket 630 includes first accommodating holes 633*a* and 633*b* in which a part of the driving motors 602*a* and 602*b* is accommodated and first locking units 634*a* and 634*b* which form the surrounding of the first accommodating holes 633*a* and 633*b* and prevent the driving motors 602*a* and 602*b* from being upwardly deviated.

The first accommodating holes 633*a* and 633*b* form holes passing through the middle cover bracket 630 in the up-down direction and one pair of the first accommodating holes 633*a* and 633*b* may be rotationally symmetric to each other with respect to the vertical axis.

The first locking units 634*a* and 634*b* may be formed such that a cross-section of the first accommodating holes 633*a* and 633*b* is upwardly reduced.

The lower cover bracket 640 is coupled to the middle cover bracket 630 at the back of the middle cover bracket 630.

The lower cover bracket 640 may be hooked to the middle cover bracket 630. To this end, a plurality of hooks 641 protruding toward the middle cover bracket 630 is formed in the lower cover bracket 640 and a plurality of locking hooks 631 to which the hook 641 is locked may be formed in the middle cover bracket 630.

The lower cover bracket 640 may be configured to include the second accommodating holes 643*a* and 643*b* in which a part of the driving motors 602*a* and 602*b* is accommodated and second locking units 644*a* and 644*b* which form the surrounding of the second accommodating holes 643*a* and 643*b* and prevent the driving motors 602*a* and 602*b* from being downwardly deviated.

The second accommodating holes 643*a* and 643*b* form holes passing through the lower cover bracket 640 in the up-down direction and one pair of the second accommodating holes 643*a* and 643*b* may be rotationally symmetric to each other with respect to the vertical axis.

The second locking units 644*a* and 644*b* may be formed such that a cross-section of the second accommodating holes 643*a* and 643*b* is downwardly reduced.

Wing units 632 which are coupled to the body 200 may protrude at left and right sides of the middle cover bracket 630 or the lower cover bracket 640. In the drawings illustrating a specific embodiment of the present invention, the wing unit 632 are formed in the middle cover bracket 630.

In a state in which the driving motors 602*a* and 602*b* are seated on the first accommodating holes 633*a* and 633*b* of the middle cover bracket 630, the lower cover bracket 640 is hooked to the middle cover bracket 630. Therefore, the driving motors 602*a* and 602*b* are fixed onto the bracket 601 by the middle cover bracket 630 and the lower cover bracket 640.

As described above, the driving module 600 may be easily and stably assembled and in the embodiment of the present invention, after assembling the driving module 600, the driving module 600 may be coupled to the body 200 and the moving plate 300.

Further, the rack 660 is coupled to a lower surface of the sliding plate 650 and the sliding plate 650 is restrained by the bracket 601 to prevent upward movement of the sliding plate 650 from the bracket 601. Therefore, when the moving plate 300 moves with respect to the body 200, close and stable engagement of the driving gears 603*a* and 603*b* and the rack 660 may be maintained.

As described above, in the display device 1 according to the embodiment of the present invention, the driving gears 603*a* and 603*b* and the rack 660 may be stably engaged and the sliding plate 650 may stably be slid.

According to the display device 1 according to the embodiment of the present invention, one pair of driving motors 602*a* and 602*b* and one pair of driving motors 603*a* and 603*b* are provided to be disposed in the left-right direction so that the size of the driving module 600 may be reduced and a bracket 601 with a narrow width in the front-rear direction.

For the purpose of stable coupling of the sliding plate 650 and the moving plate 300, the sliding plate 650 needs to have a width (width in the left-right direction) having a predetermined size or more. In the embodiment of the present invention, one pair of driving motors 602*a* and 602*b* and the driving gears 603*a* and 603*b* are provided within a range of the width of the sliding plate 650 so that a small-sized (slim) sliding module 600 while exerting sufficient power and excluding the size increase of the driving module 600.

Further, the rack 660 is configured to include a first rack unit 661*a* and a second rack unit 661*b* so that sufficient power for moving the flexible display 500 is exerted and the left-right balance may be maintained.

Further, the first rack unit 661*a* and the second rack unit 661*b* are formed so as not to overlap each other. Therefore, the first rack unit 661*a* is engaged with the first driving gear 603*a* and the second rack unit 661*b* is engaged with the second driving gear 603*b* to suppress the rack 660 from being worn out faster than the driving gears 603*a* and 603*b* and the durability of the driving module 600 is ensured as a whole.

When the display device 1 according to the embodiment of the present invention varies from the first state to the second state (an exposed area of the flexible display 500 which is exposed in the upward direction is increased) and varies from the second state to the first state (an exposed area of the flexible display 500 which is exposed in the upward direction is reduced), uniform tension may be applied to the flexible display 500, which will be described below.

FIG. 9A is a view conceptually and schematically illustrating a flexible display device 1 according to another embodiment of the present invention. FIG. 9B is a view illustrating that the flexible display device 1 illustrated in FIG. 9A is varied.

FIG. 9C is a view illustrating that configurations of the flexible display device 1 illustrated in FIG. 9A are separated. FIG. 9D is a view illustrating that configurations of a flexible display device 1 according to still another embodiment of the present invention are separated.

FIG. 10 is a view conceptually and schematically illustrating a shape and an operation of a moving plate 300 of a flexible display device 1 according to still another embodiment of the present invention.

The display device 1 according to the embodiment of the present invention is configured to include a moving plate 300, a first support 210, a first shaft 211, a second support 220, a second shaft 221, and a driving track 400, in addition to the body 200 and the flexible display 500.

The first shaft 211 is located at a lower side of the moving plate 300 and at the same position as the rear end or behind the moving plate 300. The first shaft 211 is parallel to the left-right direction (parallel to the Y-direction).

The first support 210 is located along the first shaft 211. The first support 210 may be divided into a plurality of supports.

The first support 210 may be formed so as not to rotate. However, in this case, a rear surface of the first support 210 may have a semi-circular shape (see FIGS. 11A and 11B).

In the meantime, the first support 210 may be coupled to the body 200 to be rotatable in a clockwise direction and a counterclockwise direction (hereinafter, referred to as "rotatable back and forth") with respect to the first shaft 211. That is, the first support 210 may be coupled to the body 200 to be rotatable back and forth with respect to the first shaft 211 which is parallel to the left-right direction. In this case, the first support 210 may be configured as a roller or a pulley.

The first support 210 may be located behind the second support 220.

The first support 210 may have a cylindrical shape with the first shaft 211 as a central axis. The driving track 400 is engaged with the first support 210 and when the driving track 400 moves (rotates), the first support 210 may rotate to smoothly move (rotate) the driving track 400.

The second shaft 221 is located at a lower side of the moving plate 300 and in front of the first shaft 211. The second shaft 221 is formed to be parallel to the first shaft 211.

The second support 220 is located along the second shaft 221. The second support 220 may be divided into a plurality of supports.

The second support 220 is spaced apart from the first support 210 and coupled to the body 200 to be rotatable back and forth with respect to the second shaft 221. The second support 220 may be configured as a roller or a pulley.

The second support 220 is located at a lower side of the moving plate 300 and in front of the first support 210 and is coupled to the body to be rotatable back and forth with respect to the second shaft 221 which is parallel to the first shaft 211.

The second support 220 may have a cylindrical shape with the second shaft 221 as a central axis. The driving track 400 is engaged with the second support 220 and when the driving track 400 moves (rotates), the second support 220 may rotate to smoothly move (rotate) the driving track 400.

A rotation direction of the second support 220 coincides with the rotation direction of the first support 210.

The moving plate 300 is coupled to the body 200 to be reciprocal along the movement path.

The moving plate 300 is configured to have a plate shape and supports a lower surface of a part of the flexible display 500. An upper surface 310 (an outer surface) of the moving plate 300 may be formed to have a smooth shape.

The moving plate 300 may be formed to be a flat surface. When the moving plate 300 is formed to be a flat surface, the movement path 301 of the moving plate 300 may be formed along an extending surface of a surface which is formed by the moving plate 300. In this case, the moving path 301 may form a linear shape.

When the moving plate 300 is formed to be a flat surface, the movement path 301 of the moving plate 300 may be orthogonal to an arbitrary parallel line which is parallel to the first shaft 211.

Specifically, the moving plate 300 may be coupled to the body 200 so as to reciprocate in the front-rear direction.

The driving track 400 is configured such that at least a part is bendable to surround the first support 210 and the second support 220. That is, an inner surface of a part of the driving track 400 may be in close contact with the outer surface of the first support 210 and an inner surface of the other part of the driving track 400 may be in close contact with the outer surface of the second support 220.

In the display device 1 according to an embodiment of the present invention, the driving track 400 disposed around the first support 210 and the second support 220 may be formed to be applied with a predetermined tension without entirely being loosen, which may be adjusted by the entire length of the driving track 400, a distance between the first support 210 and the second support 220, and whether to include a separate pulley, and the like.

The driving track 400 may be configured to include a first coupling unit 411 which forms one end and a second coupling unit 421 which is connected to the first coupling unit 411 to form the other end.

The driving track 400 itself may form a closed loop (circulating loop). That is, the driving track 400 may form a loop shape which is connected as a whole without having any break in the middle (see FIG. 9C). In this case, the first coupling unit 411 is coupled to the moving plate 300 and the second coupling unit 421 is coupled to the first coupling unit 411. As described above, the first coupling unit 411 and the second coupling unit 421 are coupled to each other and the driving track 400 may form continuous tracks.

In contrast, the driving track 400 may be formed to have a loop shape which is partially broken in the middle (see FIG. 9D). In this case, the first coupling unit 411 is coupled to the moving plate 300 and the second coupling unit 421 is also coupled to the moving plate 300. That is, the first coupling unit 411 and the second coupling unit 421 are coupled to be spaced apart from each other and the driving track 400 is coupled to the moving plate 300 to form continuous tracks together with the moving plate 300.

In the description of the display device 1 according to the embodiment of the present invention, a length direction of the driving track 400 is an arbitrary direction orthogonal to the left-right direction (a direction parallel to the Y-direction) or an arbitrary direction which rotates with respect to the first shaft 211 or the second shaft 221.

In the description of the display device 1 according to the embodiment of the present invention, a length direction of the driving track 400 may be a direction which extends from the first coupling unit 411 to be continued to the second coupling 421 via a portion enclosing the first support 210 and a portion enclosing the second support 220 or an opposite direction thereto.

In the display device 1 according to the embodiment of the present invention, the flexible display 500 is integrally formed as one display and a portion is coupled to the outer surface of the moving plate 300 and the other portion is coupled to the outer surface of the driving track 400.

In a specific embodiment, a middle portion of the flexible display 500 is bent, a part of the flexible display 500 which is located at an upper portion faces upward, and a part of the flexible display 500 which is located at a lower portion faces downward.

In the display device 1 according to the embodiment of the present invention, the flexible display 500 may be formed so as not to overlap by itself and the entire length (a length extending in a linear shape) of the flexible display 500 may be shorter than the entire length (a length extending in a linear shape) of the driving track 400.

In the display device 1 according to the embodiment of the present invention, when the first state is changed to the second state (an exposed area of the flexible display 500 at the upper portion is increased), the moving plate 300 forwardly moves and the driving track 400 is pulled in the clockwise direction with respect to FIG. 9A. A uniform tension is applied to the entire section of the driving track 400 and a partial section of the driving track 400 is not bent.

In this case, the flexible display 500 which is coupled to the moving plate 300 and the outer surface of the driving track 400 moves together with the moving plate 300 and the driving track 400 and a tension applied to the flexible display 500 may be constantly maintained.

In the display device 1 according to the embodiment of the present invention, when the second state is changed to the first state (an exposed area of the flexible display 500 at the upper portion is reduced), the moving plate 300 backwardly moves and the driving track 400 is pulled while rotating in the counterclockwise direction with respect to FIG. 9B. A uniform tension is applied to the entire section of the driving track.

In this case, the flexible display 500 which is coupled to the moving plate 300 and the outer surface of the driving track 400 moves together with the moving plate 300 and the driving track 400 and a tension applied to the flexible display 500 may be constantly maintained.

FIG. 11A is a cross-sectional view of a flexible display device 1 illustrated in FIG. 2A taken along C-C'. FIG. 11B is a view illustrating that the flexible display device 1 illustrated in FIG. 11A is varied. FIG. 11C is a cross-sectional view illustrating a flexible display device 1 according to still another embodiment of the present invention. FIG. 11D is a cross-sectional view illustrating a flexible display device 1 according to still another embodiment of the present invention.

FIGS. 12A and 12B are perspective bottom views illustrating an operation of some components of a flexible display device 1 according to still another embodiment of the present invention. Specifically, in FIGS. 12A and 12B, partial configurations of the driving track 400 and the driving module 600 coupled to the moving plate 300 are illustrated.

FIGS. 11A and 12A illustrate a first state and FIGS. 11B and 12B illustrate a second state.

The driving track 400 may be configured to include a back plate 430, hinge segments 411, 412, and 413, and a guide plate 420.

The back plate 430 may have a size corresponding to the entire inner surface of the flexible display 500 and may be coupled to the entire inner surface (see FIG. 4).

Hinge segments 411, 412, and 413 are longitudinally formed along the left-right direction and a plurality of hinge segments is provided to be coupled to the back plate 430 while being continuously disposed in the inner surface of the back plate 430.

The back plate 430 and the hinge segments 411, 412, and 413 may be coupled by various methods such as adhesion or welding.

At least a part of the guide plate 420 is formed by a metal plate having an elasticity, one end 422 may be connected to a third hinge segment 413 and the other end 421 may be coupled to the moving plate 300.

In the display device 1 according to the embodiment of the present invention, one pair of guide plates 420 may be provided. One pair of guide plates 420 is formed on a bottom surface of the moving plate 300 to be symmetric in a left-right direction and also formed to be symmetric in the left-right direction with respect to the driving module 600.

In the description of the display device 1 according to the embodiment of the present invention, a length direction of the flexible display 500 is an arbitrary direction orthogonal to the left-right direction (a direction parallel to the Y-direction) or an arbitrary direction which rotates with respect to the first shaft 211.

In the display device 1 according to the embodiment of the present invention, the flexible display 500 may include a basic exposed region 501 and an additional exposed region 502 (see FIGS. 2B, 9C, and 11B).

The basic exposed region 501 is a region which is exposed to overlap the outer surface 310 of the moving plate 300 and the basic exposed region 501 may be an area of the flexible display 500 which is exposed upward in the first state.

The additional exposed region 502 is a region which is exposed to overlap the outer surface of the driving track 400, other than the basic exposed region 501. The additional exposed region 502 may be an area of the flexible display 500 exposed upward in the second state, excluding the basic exposed region 501.

In the display device 1 according to an embodiment of the present invention, a size of the additional exposed region 502 which is exposed together at the same side as the basic exposed region 501 varies in accordance with the movement of the moving plate 300.

The hinge segments 411, 412, and 413 may be formed of a rigid material to maintain its shape. The hinge segments 411, 412, and 413 may be formed of metal or plastic or configured to include the same.

Among the hinge segments, a first hinge segment 411 which forms one end in a length direction is located to be close to a rear end of the moving plate 300 and the third hinge segment 413 which forms the other end is coupled to the guide plate 420. A plurality of second hinge segments 412 which is continuously disposed along the length direction, excluding a portion 411 which is close to the rear end of the moving plate 300 and a portion 413 coupled to the guide plate 420, may be formed to be same. Further, a cross-section of each second hinge segment 412 may be uniform along the left-right direction. A cross-section of each second hinge segment 412 may be formed to have a trapezoidal shape having an outer width larger than an inner width.

The hinge segments 411, 412, and 413 may have a constant thickness (a width in an up-down direction when the hinge segments are located along the front-rear direction) and a thickness of each hinge segments 411, 412, and 413 may be equal or similar to the thickness (a width in the up-down direction) of the moving plate 300.

Among the hinge segments 411, 412, and 413, the first hinge segment 411 which is connected to the rear end of the moving plate 300 may be the above-described first coupling unit 411. The first hinge segment 411 may be rotatably connected to the second hinge segment 412 which is immediately adjacent thereto and the first hinge segment 411 may be rotatably connected to the moving plate 300. In this case, the thickness of the first hinge segment 411 may be equal to or similar to the thickness of the moving plate 300.

When the first hinge segment 411 is rotatably connected to the moving plate 300, a rotation axis thereof is parallel to the first shaft 211 and when the first hinge segment 411 is rotatably connected to the second segment 412 which is adjacent thereto, a rotation axis is parallel to the first shaft 211.

The second hinge segments 412 are rotatably coupled to each other and the rotation axes are parallel to the first shaft 211.

The first hinge segment 411 which forms the first coupling unit 411 is formed so as to reciprocate in the front-rear direction in the body 200 and the first hinge segment 411 is located above a segment which connects the first shaft 211 and the second shaft 221.

The second hinge segments 412 may be bent in a position to be engaged with the first support 210 and may be spread to be flat in the other position.

In the hinge segment, the third hinge segment 413 coupled to the guide plate 420 may be rotatably connected to the second hinge segment 412 which is immediately adjacent thereto.

The third hinge segment 413 may be coupled to the guide plate 420 in a first middle coupling unit 414.

The third hinge segment 413 is formed so as to reciprocate in the front-rear direction in the body 200 and the third hinge segment 413 is located below a segment which connects the first shaft 211 and the second shaft 221.

In the display device 1 according to the embodiment of the present invention, the first support 210 and the second support 220 may be formed so as to relatively move to be spaced apart from each other.

Further, the display device 1 may further include an elastic body 280 which elastically support any one of the first support 210 and the second support 220 to be spaced apart from the other one (see FIGS. 11A, 11B, and 11D).

In the specific embodiment of the present invention, the first support 210 may be disposed such that the shaft (first shaft 211) is located in a fixed position with respect to the body 200 and the second support 220 may be formed such that the shaft (the first shaft 211) reciprocates in the front-rear direction with respect to the body 200. In this case, the elastic body 280 may pressurize the second support 220 to be spaced apart from the first support 210.

The elastic body 280 may be formed to have a general coil spring shape. The elastic body 280 is configured to store an elastic force in a compressed state and pressurize the first support 210 in this state.

In the embodiment of the present invention, the elastic body 280 may be configured to directly pressurize the second support 220 or pressurize the first support 210 by means of a separate pusher 281.

By doing this, the driving track is applied with a uniform tension over the entire section without being loosened and a uniform tension may be applied to the flexible display 500.

The elastic body 280 and the pusher 281 are supported in the body 200 to operate and for example, are supported in the center body 230 which will be described in the embodiment of the present invention to operate.

FIG. 13 is a plan view of a guide plate 420 according to an embodiment of the present invention and also illustrates an enlarged shape of the pattern of the guide plate 420.

In the display device 1 according to the embodiment of the present invention, a plurality of guide plates 420 may be provided.

At least a part of the guide plate 420 may be formed of a metal plate having elasticity. The guide plate 420 may be formed of super elastic metal.

The guide plate 420 may be formed of a super elastic wire, a flexinol actuator wire, or a shape-memory alloy or configured to include the same.

The guide plate 420 may be formed as a relatively thin plate. The guide plate 420 may be formed to have an arbitrary thickness within a range of 0.05 to 0.2 mm and may be formed to have a thickness of 0.1 mm.

Two or more guide plates 420 may be provided in one driving track 400.

One end of the guide plate 420 is coupled to the third hinge segment 413 and the other end forms the second coupling unit 421.

A portion of the guide plate 420 which is connected to the first middle coupling unit 414 of the third hinge segment 413 forms a second middle coupling unit 422. The first middle coupling unit 414 of the third hinge segment 413 and the second middle coupling unit 422 may be coupled by a fastening unit such as a bolt or coupled to each other by locking, adhesion, welding, or the like.

The second coupling unit 421 of the guide plate 420 may be coupled to the first coupling unit 411 or coupled to the moving plate 300.

When the second coupling unit 421 is coupled to the moving plate 300, the second coupling unit 421 may be in close contact with one point 322a of the bottom surface of the moving plate 300. The second coupling unit 421 and the moving plate 300 may be coupled by the fastening unit such as a bolt or may be coupled by the locking, the adhesion, welding, or the like.

When the second coupling unit 421 is coupled to the moving plate 300, the second coupling unit 421 may be coupled to a point 322a which is close to a rear end of the moving plate 300. That is, the second coupling unit 421 is coupled to the moving plate 300 at the point 322a which is located further back from a center between the front end and the rear end of the moving plate 300.

The guide plate 420 may be configured to include a support unit 423 and a first through hole 424.

The support unit 423 forms both edges along the length direction of the guide plate 420. The support unit 423 may form a linear shape as a whole.

The first through hole 424 passes through the support units 423 in the thickness direction and formed to be long in the width direction. The first through hole 424 may be repeatedly formed along the length direction of the guide plate 420 and also repeatedly formed along the width direction of the guide plate 420.

As the first through hole 424 is repeatedly formed in the width direction in the guide plate 420, the guide plate 420 may be easily bent with respect to a rotation axis of the width direction.

The guide plate 420 includes the support unit 423 and the first through hole 424 so that when the guide plate 420 is bent with respect to the second shaft 221 of the second support 220, the guide plate 420 may be easily elastically deformed and easily control the spring back.

FIG. 14 is a plan view of a back plate 430 according to an embodiment of the present invention and also illustrates an enlarged shape of the pattern of the back plate 430.

In the display device 1 according to the embodiment of the present invention, the flexible display 500 may be formed by laminating a plurality of layers and a display layer 510 which displays images is formed at the outside and the back plate 430 may be coupled to a lower portion of the display.

The back plate 430 may be formed of a metal plate having elasticity. The back plate 430 may be configured to include a super elastic metal.

The back plate 430 may allow the flexible display 500 to be smoothly elastically deformed and elastically restored.

The back plate 430 may be formed as a relatively thin plate. The back plate 430 may be formed to have an arbitrary thickness within a range of 0.05 to 0.2 mm and may be formed to have a thickness of 0.1 mm.

In the display device 1 according to the embodiment of the present invention, the back plate 430 may be formed of a metal plate as a whole and may be divided into two or more areas.

Specifically, the back plate 430 may be configured to include a fixed area 430a and a deformable area 430b.

The fixed area 430a is an area overlapping an outer surface 310 of the moving plate 300. In the fixed area 430a, the moving plate 300 may be formed to have a flat metal plate as a whole.

In the fixed area 430a, the back plate 430 may be formed to be symmetrical in the left-right direction.

The deformable area 430b is an area overlapping an outer surface of the hinge segments of the driving track 400. In the deformable area 430b, a plurality of second through holes 435 is formed to be long in the width direction (left-right direction). That is, in the deformable area 430b, a plurality of through holes 435 which passes through the thickness direction is formed in the moving plate 300.

In the deformable area 430b, the back plate 430 may be formed to be symmetrical in the left-right direction.

The deformable area 430b in which the plurality of second through holes 435 is formed may include an edge 431, a horizontal connecting unit 432, and a first vertical connecting unit 433.

The edge 431 is divided into a plurality of edges to form a left edge and a right edge of the back plate 430. The edges 431 have a predetermined length along the length direction and are spaced apart from each other.

The horizontal connecting unit 432 extends from the edge 431 in the width direction. Two horizontal connecting units 432 extend from one edge 431.

The first vertical connecting unit 433 connects two horizontal connecting units 432 extending from different edges 431. That is, the first vertical connecting unit 433 connects two horizontal connecting units 432 which extend from adjacent two edges 431 and are adjacent to each other. The first vertical connecting unit 433 may be repeatedly formed along the width direction (left-right direction) and the first vertical connecting units 433 may be spaced apart from each other with a regular interval.

A second vertical connecting unit 434 may be formed in the deformable area 430b and the second vertical connecting unit 434 connects two horizontal connecting units 432 extending from the same edge 431. The second vertical connecting unit 434 may be repeatedly formed along the width direction (left-right direction) and the second vertical connecting units 434 may be spaced apart from each other with a regular interval.

As described above, the second through holes 435 which are long in the width direction are repeatedly formed in the deformable area 430b so that the deformable area 430b may be easily bent with respect to the rotation axis of the width direction.

When a tensile force which is an external force is applied to the deformable area 430b along the length direction, the edge 431 and the first vertical connecting unit 433 may be deformed to be spaced apart from each other in the length direction with respect to the horizontal connecting unit 432 and the length of the deformable area 430b may be increased over the entire area. When the external force is removed, the deformable area 430b is elastically recovered to its original state.

Further, when a tensile force which is an external force is applied to the deformable area 430b along the length direction, the first vertical connecting unit 433 and the second vertical connecting unit 434 may be deformed to be spaced apart from each other in the length direction with respect to the horizontal connecting unit 432 and the length of the deformable area 430b may be increased over the entire area. When the external force is removed, the deformable area 430b is elastically restored to its original state.

Since the back plate 430 includes the deformable area 430b, an area overlapping the outer surfaces of the hinge segments 411, 412, and 413 of the driving track 400 may be more flexibly deformed. Further, when the flexible display 500 is bent with respect to the first shaft 211 of the first support 210, the flexible display 500 may be easily elastically deformed and easily control the spring back.

Further, the back plate 430 includes the deformable area 430b so that the flexible display 500 may be elastically deformed within a predetermined range along the length direction.

FIG. 15A is a plan view illustrating some of hinge segments 412 and 413 according to an embodiment of the present invention. FIG. 15B is a bottom view illustrating a part of a body 200 according to an embodiment of the present invention. FIGS. 16A and 16B are cross-sectional views illustrating an operation of a flexible display device 1 according to still another embodiment of the present invention.

In the display device 1 according to an embodiment of the present invention, the driving track 400 may be configured to include a magnet 415 and the body 200 includes a first hole sensor 291 and a second hole sensor 292. The first hole sensor 291 and the second hole sensor 292 may be formed on a center body 230.

The magnet 415 may be a general permanent magnet or an electromagnet.

The first hole sensor 291 and the second hole sensor 292 may be formed as general hole sensors and detects a change in a magnetic field when the magnet 415 approaches or moves away and thus detects the movement of the driving track 400.

In the embodiment of the present invention, the first hole sensor 291 is configured to sense the approach of the magnet 415 when the moving plate 300 forwardly moves.

Further, the second hole sensor 292 is configured to sense the approach of the magnet 415 when the moving plate 300 backwardly moves.

In the flexible display device 1 according to the embodiment of the present invention, the rotational speed of the driving motors 602a and 602b may be controlled in accordance with a signal sensed by the first hole sensor 291 and the second hole sensor 292.

For example, when the first state is switched to the second state and the magnet 415 approaches the first hole sensor 291, the rotational speed of the driving motors 602*a* and 602*b* is reduced and when the magnet is proximate to the first hole sensor 291 as much as possible, the rotational speed of the driving motors 602*a* and 602*b* may stop.

Further, when the second state is switched to the first state and the magnet 415 approaches the second hole sensor 292, the rotational speed of the driving motors 602*a* and 602*b* is reduced and when the magnet 415 is proximate to the second hole sensor 292 as much as possible, the rotation of the driving motors 602*a* and 602*b* may stop.

An extendable range that the screen of the flexible display 500 may be effectively limited.

Further, it is possible to provide the flexible display device 1 which smoothly and promptly operate by controlling the speed of the driving motors 602*a* and 602*b* in different speeds depending on a timing when the screen of the flexible display 500 starts to extend, a timing when the extension is completed, a timing when the screen of the flexible display 500 starts to be reduced, and a timing when the reduction is completed.

Although a specific embodiment of the present invention has been described and illustrated above, the present invention is not limited to the described embodiment and it is understood by those skilled in the art that the present invention may be modified and changed in various specific embodiments without departing from the spirit and the scope of the present invention. Therefore, the scope of the present invention is not determined by the described embodiment, but may be determined by the technical spirit described in the claims.

The industrial applicability of the flexible display device according to the embodiment of the present invention is obvious in that the driving module is coupled to the body and the moving plate after assembling the driving module so that the moving plate and the sliding plate are prevented from being loosened and the idle operation of the driving gear is prevented.

What is claimed is:

1. A flexible display device, comprising:
   a body;
   a moving plate configured to reciprocate between a first position and a second position with respect to the body;
   a flexible display coupled to the moving plate; and
   a driving module configured to move the moving plate with respect to the body,
   wherein the driving module comprises:
   a bracket coupled to the body;
   a sliding plate comprising a gear rack and coupled to the moving plate, wherein the sliding plate is slidably coupled to the bracket and movement of the sliding plate causes the moving plate to be moved; and
   a pair of driving motors coupled to the bracket and configured to drive a pair of corresponding driving gears engaged with the gear rack,
   wherein each of the driving motors is arranged to be laterally adjacent to each other.

2. The flexible display device according to claim 1, wherein the body comprises:
   a first holder comprising a first rail;
   a second holder spaced apart from the first holder and comprising a second rail parallel to the first rail; and
   a center body between the first holder and the second holder,
   wherein the moving plate comprises:
   a first slider at a first side and configured to slide along the first rail; and
   a second slider at a second side of the moving plate opposite the first side and configured to slide along the second rail.

3. The flexible display device according to claim 1, wherein the gear rack is formed on a lower side of the sliding plate and the sliding plate is secured by the bracket to prevent upward movement of the sliding plate from the bracket.

4. The flexible display device according to claim 1, wherein the bracket comprises:
   a support bracket formed of a metal plate and including rail coupling units at opposing sides of the support bracket;
   a pair of moving rails respectively coupled to each of the rail coupling units, wherein the each of the moving rails are slidably engaged to an edge of the sliding plate; and
   a cover bracket coupled to the support bracket and configured to support the pair of driving motors.

5. The flexible display device according to claim 4, wherein the cover bracket comprises:
   a middle cover bracket coupled to a lower side of the support bracket; and
   a lower cover bracket coupled to a lower side of the middle cover bracket,
   wherein the middle cover bracket comprises:
   a first accommodating hole configured to accommodate one of the driving motors; and
   a first locking unit forming a surrounding of the first accommodating hole and configured to prevent movement of the one driving motor,
   wherein the lower cover bracket comprises:
   a second accommodating hole configured to accommodate the one driving motor; and
   a second locking unit forming a surrounding of the second accommodating hole and configured to prevent movement of the one driving motor.

6. The flexible display device according to claim 5, wherein the support bracket comprises a third accommodating hole configured to accommodate the one driving motor,
   wherein the driving gear is engaged with the gear rack through the third accommodating hole.

7. The flexible display device according to claim 4, wherein:
   the cover bracket comprises a middle cover coupled to a lower side of the support bracket and a lower cover bracket coupled to a lower side of the middle cover bracket;
   wing units formed at opposite sides of the middle cover or the lower cover bracket, each wing unit configured to be coupled to the body; and
   wherein the body comprises:
   a bracket accommodating hole passing through the body and configured to accommodate the bracket therethrough; and
   a wing seating groove corresponding to each wing unit and located adjacent to the bracket accommodating hole, wherein each wing seating groove is concave and configured to secure a corresponding wing unit therein.

8. The flexible display device according to claim 1, wherein the gear rack is centrally located at the moving plate.

9. The flexible display device according to claim 8, wherein each of the driving gears are disposed between the driving motors.

10. The flexible display device according to claim 9, wherein the gear rack includes:
- a first gear rack unit configured to be engaged with a first driving gear of the pair of driving gears; and
- a second gear rack unit configured to be engaged with the second driving gear of the pair of driving gears,
- wherein the first gear rack unit and the second gear rack unit are parallel.

11. The flexible display device according to claim 4, wherein the sliding plate is formed of a metal plate and the gear rack is formed of engineering plastic.

12. The flexible display device according to claim 1, further comprising:
- a first shaft aligned perpendicular to a reciprocating direction of the moving plate;
- a first support located along the first shaft;
- a second shaft located below the moving plate and aligned parallel to the first shaft;
- a second support located along the second shaft; and
- a driving track formed to wrap around the first support and the second support and configured to be coupled to the moving plate to reciprocate with respect to the first shaft and the second shaft.

13. The flexible display device according to claim 12, wherein the flexible display is coupled to an outer surface of the driving track and such that the flexible display is wrapped around the first support and the second support to extend from a first side to a second side of the flexible display device.

14. The flexible display device according to claim 12, wherein the flexible display comprises:
- a first region overlapping the moving plate; and
- a second region overlapping the driving track other than the first region,
- wherein a size of the second region visible at a first side of the flexible device varies based on a position of the moving plate.

15. The flexible display device according to claim 12, wherein the driving track includes:
- a flexible back plate which is formed of metal and coupled to an inner surface of the flexible display;
- a plurality of adjacently arranged elongated hinge segments; and
- a flexible guide plate formed of metal and having one end connected to a hinge segment and another end coupled to the moving plate.

16. The flexible display device according to claim 12, further comprising an elastic body configured to bias the first support or the second support away from the other.

17. The flexible display device according to claim 12, wherein the driving track further comprises a magnet and the body further comprises:
- a first hole sensor configured to sense a position of the magnet of the driving track as the moving plate is moved from the first position toward the second position; and
- a second hole sensor configured to sense a position of the magnet of the driving track as the moving plate is moved from the second position toward the first position,
- wherein a rotation speed of the driving motor is based on a signal sensed by the first hole sensor or the second hole sensor.

* * * * *